US010404509B2

(12) United States Patent
Sun et al.

(10) Patent No.: US 10,404,509 B2
(45) Date of Patent: Sep. 3, 2019

(54) SLOT STRUCTURE DESIGN USING GUARD INTERVALS IN A SINGLE CARRIER WAVEFORM

(71) Applicant: QUALCOMM Incorporated, San Diego, CA (US)

(72) Inventors: Jing Sun, San Diego, CA (US); Xiao Feng Wang, San Diego, CA (US); Tao Luo, San Diego, CA (US); Tamer Kadous, San Diego, CA (US); Sony Akkarakaran, Poway, CA (US); Juan Montojo, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/975,166

(22) Filed: May 9, 2018

(65) Prior Publication Data
US 2018/0331870 A1    Nov. 15, 2018

Related U.S. Application Data

(60) Provisional application No. 62/505,093, filed on May 11, 2017.

(51) Int. Cl.
H04W 72/04    (2009.01)
H04L 27/26    (2006.01)
(Continued)

(52) U.S. Cl.
CPC ........ *H04L 27/2607* (2013.01); *H04L 5/0007* (2013.01); *H04L 27/2613* (2013.01);
(Continued)

(58) Field of Classification Search
USPC .......................................... 375/260; 370/329
See application file for complete search history.

(56) References Cited

U.S. PATENT DOCUMENTS

2010/0061320 A1*  3/2010  Lakkis ................ H04L 27/2602
                                                   370/329
2010/0165943 A1*  7/2010  Kato ........................ H04W 8/26
                                                   370/329
(Continued)

OTHER PUBLICATIONS

Intel Corporation: "Further Discussion on GI-IDT -s-OFDM for High Frequency Bands above 40 GHz", 3GPP Draft; R1-1612589, 3rd Generation Partnership Project (3GPP), Mobile Competence Centre, 650, Route Des Lucioles, F-06921 Sophia-Antipolis Cedex, France, vol. RAN WG1, No. Reno. USA; Nov. 14, 2016-Nov. 18, 2016 Nov. 13, 2016, XP051176534, Retrieved from the Internet: URL:http://www.3gpp.org/ftp/Meetings_3GPP_SYNC/RAN1/Docs/ [retrieved on Nov. 13, 2016], 9 pages.

(Continued)

*Primary Examiner* — Eva Y Puente
(74) *Attorney, Agent, or Firm* — Linda G. Gunderson; Holland & Hart LLP

(57) ABSTRACT

Methods, systems, and devices for wireless communication are described for slot structures using guard intervals in a single carrier waveform. Techniques provide for generating a first waveform for control information or reference signal transmissions in a first subset of symbols, and generating a second waveform for data to be transmitted in a second subset of symbols. A combination waveform may be generated based on the first and second waveforms that is transmitted to a receiver, such as by concatenating the first and second waveforms. The first waveform may be generated by appending a guard interval (GI) sequence to a reference signal or control information, and performing a discrete Fourier transform spread frequency division multi- (Continued)

plexing (DFT-s-FDM) procedure. The second waveform may be generated by appending the GI to data to be transmitted in each symbol of the second subset of symbols, and performing the DFT-s-FDM procedure.

30 Claims, 21 Drawing Sheets

(51) Int. Cl.
*H04L 5/00* (2006.01)
*G06F 17/14* (2006.01)

(52) U.S. Cl.
CPC ...... *H04L 27/2614* (2013.01); *H04L 27/2636* (2013.01); *G06F 17/141* (2013.01); *H04L 5/0051* (2013.01); *H04L 5/0053* (2013.01); *H04W 72/0413* (2013.01)

(56) References Cited

U.S. PATENT DOCUMENTS

| | | | | |
|---|---|---|---|---|
| 2014/0092845 | A1* | 4/2014 | Yamada | H04W 56/0005 370/329 |
| 2015/0215969 | A1* | 7/2015 | Yamada | H04W 74/008 370/329 |
| 2017/0048046 | A1* | 2/2017 | Sun | H04L 5/0007 |
| 2018/0279327 | A1* | 9/2018 | Ying | H04W 72/12 |

OTHER PUBLICATIONS

Interdigital Communications et al., "Discussion on Unique Word DFT-S-OFDM Waveform for New Radio", 3GPP Draft; R1-165065 Discussion on Unique Word DFT-S-OFDM Waveform for New Radio, 3rd Generation Partnership Project (3GPP), Mobile Competence Centre, 650, Route Des Lucioles, F-06921 Sophia-Antipolis Cedex, France, vol. RAN WG1, No. Nanjing, China; May 23, 2016-May 27, 2016 May 14, 2016, XP051089861, Retrieved from the Internet: URL:http://www.3gpp.org/ftp/tsg_ran/WG1_RL1/TSGR1_85/Docs/ [retrieved on May 14, 2016], 4 pages.
Partial International Search Report—PCT/US2018/032126—ISA/EPO—dated Sep. 6, 2018.
Qualcomm Incorporated: "Single Carrier Waveform Evaluation", 3GPP Draft; R1-164684 Single Carrier Waveform Evaluation, 3rd Generation Partnership Project (3GPP), Mobile Competence Centre, 650, Route Des Lucioles, F-06921 Sophia-Antipolis Cedex, France, vol. RAN WG1, No. Nanjing, China; May 23, 2016-May 27, 2016 May 14, 2016, XP051089949, Retrieved from the Internet: URL:http://www.3gpp.org/ftp/tsg ran/WG1_RL1/TSGR1_85/Docs/ [retrieved on May 14, 2016], 9 pages.
International Search Report and Written Opinion—PCT/US2018/032126—ISA/EPO—dated Nov. 7, 2018.

* cited by examiner

SLOT STRUCTURE DESIGN USING GUARD INTERVALS IN A SINGLE CARRIER WAVEFORM

CROSS REFERENCES

The present Application for Patent claims the benefit of U.S. Provisional Patent Application No. 62/505,093 by SUN, et al., entitled "Slot Structure Design Using Guard Intervals in a Single Carrier Waveform," filed May 11, 2017, assigned to the assignee hereof, and expressly incorporated by reference in its entirety.

BACKGROUND

The following relates generally to wireless communication, and more specifically to slot structure design using guard intervals in a single carrier waveform.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communication for multiple communication devices, each of which may be otherwise known as a user equipment (UE). In some cases, a UE may identify multiple streams (e.g., waveforms including data or reference signals) to transmit to a base station, and the UE may multiplex these streams onto a set of resources for an uplink transmission. In some cases, a UE may use a single carrier waveform, such as a discrete Fourier transform spread frequency division multiplexing (DFT-s-FDM) for transmission to a base station.

SUMMARY

The described techniques relate to improved methods, systems, devices, or apparatuses that support slot structure design using guard intervals in a single carrier waveform. Generally, the described techniques provide for generating a first waveform for control information or reference signal transmissions that are to be transmitted in a first subset of symbols in a transmission slot, and generating a second waveform for data to be transmitted in a second subset of symbols of the transmission slot. A combination waveform may be generated based on the first and second waveforms that is transmitted to a receiver. The first waveform may be generated, in some examples, based on whether the first subset of symbols includes control information, a reference signal, or combinations thereof.

In some cases, a first symbol of the first subset of symbols may include a demodulation reference signal (DMRS), and the first waveform may be generated by appending a guard interval (GI) sequence to the DMRS, and performing a discrete Fourier transform spread frequency division multiplexing (DFT-s-FDM) procedure on the DMRS and GI. The second waveform may be generated by appending the GI to data to be transmitted in each symbol of the second subset of symbols, and performing the DFT-s-FDM procedure on the data and GI. In some cases, a DFT size may be the same for both the first subset of symbols and the second subset of symbols. In other cases, the DFT size may be different for the first subset of symbols and the second subset of symbols. In some cases, control may be transmitted in one or more symbols of the first subset of symbols, and the GI may be appended to the control information and the DFT-s-FDM procedure performed on the control information and GI. These techniques may help to ensure that signals included in an uplink transmission may provide good signals for channel estimation and provide desirable channel characteristics such as a peak-to-average-power ratio (PAPR) and frequency domain energy variation that are relatively low.

A method of wireless communication is described. The method may include segmenting a transmission slot into a set of symbols, identifying a first subset of the set of symbols and a second subset of the set of symbols, generating a first waveform for a first symbol of the first subset of symbols based at least in part on whether the first symbol contains control information or reference signal transmissions, generating a second waveform for a second symbol of the second subset of symbols by appending a guard interval (GI) to a set of samples containing the data to be transmitted in the second symbol and performing a discrete Fourier transform spread frequency division multiplexing (DFT-s-FDM) procedure on the data and GI, generating a combination waveform based on the first subset of symbols and the second subset of symbols, and transmitting the combination waveform to a receiver.

An apparatus for wireless communication is described. The apparatus may include means for segmenting a transmission slot into a set of symbols, means for identifying a first subset of the set of symbols and a second subset of the set of symbols, means for generating a first waveform for a first symbol of the first subset of symbols based at least in part on whether the first symbol contains control information or reference signal transmissions, means for generating a second waveform for a second symbol of the second subset of symbols by appending a GI to a set of samples containing the data to be transmitted in the second symbol and performing a DFT-s-FDM procedure on the data and GI, means for generating a combination waveform based on the first subset of symbols and the second subset of symbols, and means for transmitting the combination waveform to a receiver.

Another apparatus for wireless communication is described. The apparatus may include a processor, memory in electronic communication with the processor, and instructions stored in the memory. The instructions may be operable to cause the processor to segment a transmission slot into a set of symbols, identify a first subset of the set of symbols and a second subset of the set of symbols, generate a first waveform for a first symbol of the first subset of symbols based at least in part on whether the first symbol contains control information or reference signal transmissions, generate a second waveform for a second symbol of the second subset of symbols by appending a guard interval (GI) to a set of samples containing the data to be transmitted in the second symbol and performing a DFT-s-FDM procedure on the data and GI, generate a combination waveform based on the first subset of symbols and the second subset of symbols, and transmit the combination waveform to a receiver.

A non-transitory computer readable medium for wireless communication is described. The non-transitory computer-readable medium may include instructions operable to cause a processor to segment a transmission slot into a set of symbols, identify a first subset of the set of symbols and a second subset of the set of symbols, generate a first waveform for a first symbol of the first subset of symbols based at least in part on whether the first symbol contains control information or reference signal transmissions, generate a second waveform for a second symbol of the second subset of symbols by appending a GI to a set of samples containing the data to be transmitted in the second symbol and performing a DFT-s-FDM procedure on the data and GI, generate a combination waveform based on the first subset of symbols and the second subset of symbols, and transmit the combination waveform to a receiver.

In some examples of the method, apparatus, and non-transitory computer-readable medium described above, the generating the combination waveform includes concatenating the waveforms for the first subset of symbols and the second subset of symbols. In some examples of the method, apparatus, and non-transitory computer-readable medium described above, the first subset of symbols may be for one or more of control information or reference signal transmissions, and the second subset of symbols may be for a data transmission.

Some examples of the method, apparatus, and non-transitory computer-readable medium described above may further include processes, features, means, or instructions for identifying a demodulation reference signal (DMRS) to be transmitted in the first symbol. Some examples of the method, apparatus, and non-transitory computer-readable medium described above may further include processes, features, means, or instructions for appending the GI to the DMRS, wherein the GI may be the same as the GI applied for the second waveform in the second subset of symbols. Some examples of the method, apparatus, and non-transitory computer-readable medium described above may further include processes, features, means, or instructions for performing the DFT-s-FDM procedure on the DMRS and GI. Some examples of the method, apparatus, and non-transitory computer-readable medium described above may further include processes, features, means, or instructions for appending the GI to a previous symbol or generating a GI-only symbol based at least in part on whether the previous symbol may be transmitted. Some examples of the method, apparatus, and non-transitory computer-readable medium described above may further include processes, features, means, or instructions for performing the DFT-s-FDM procedure on the previous symbol.

In some examples of the method, apparatus, and non-transitory computer-readable medium described above, a DFT window size used in the DFT-s-FDM procedure performed on the DMRS and GI may be set to be a same DFT window size as for the DFT-s-FDM procedure performed on the data and GI when generating the second waveform for the second symbol. In some examples of the method, apparatus, and non-transitory computer-readable medium described above, the DMRS and appended GI form a reference signal usable for channel estimation at the receiver. In some examples of the method, apparatus, and non-transitory computer-readable medium described above, the DMRS and appended GI form a sequence that may be selected to may have a PAPR that may be below a PAPR threshold value and a frequency domain energy variation across tones that may be below an energy variation threshold value. In some examples of the method, apparatus, and non-transitory computer-readable medium described above, the sequence may be a Zadoff-Chu sequence.

Some examples of the method, apparatus, and non-transitory computer-readable medium described above may further include processes, features, means, or instructions for identifying a DMRS to be transmitted in the first symbol. Some examples of the method, apparatus, and non-transitory computer-readable medium described above may further include processes, features, means, or instructions for reducing a length of the DMRS sequence by an amount corresponding to a first length of the GI. Some examples of the method, apparatus, and non-transitory computer-readable medium described above may further include processes, features, means, or instructions for appending the GI to the reduced-length DMRS sequence. Some examples of the method, apparatus, and non-transitory computer-readable medium described above may further include processes, features, means, or instructions for prepending a second GI to the reduced-length DMRS sequence, wherein the prepended GI may have a second length at least as long as the first GI length, and a GI sequence of the appended GI may be a same sequence as an ending portion of the prepended GI, wherein a length of concatenation of the prepended GI, the DMRS, and the appended GI, equals a symbol length of each symbol of the set of symbols. Some examples of the method, apparatus, and non-transitory computer-readable medium described above may further include processes, features, means, or instructions for performing the DFT-s-FDM procedure on the DMRS and GIs. In some examples of the method, apparatus, and non-transitory computer-readable medium described above, a discrete Fourier transform (DFT) window size used in the DFT-s-FDM procedure performed on the DMRS and GI may be shorter than a DFT window size used in the DFT-s-FDM procedure performed on the data and GI when generating the second waveform for the second symbol.

Some examples of the method, apparatus, and non-transitory computer-readable medium described above may further include processes, features, means, or instructions for identifying control information to be transmitted in the first symbol. Some examples of the method, apparatus, and non-transitory computer-readable medium described above may further include processes, features, means, or instructions for appending the GI to the control information. Some examples of the method, apparatus, and non-transitory computer-readable medium described above may further include processes, features, means, or instructions for performing the DFT-s-FDM procedure on the control information and GI.

In some examples of the method, apparatus, and non-transitory computer-readable medium described above, a DFT window size used in the DFT-s-FDM procedure performed on the control information and GI may be set to be a same DFT window size as for the DFT-s-FDM procedure performed on the data and GI when generating the second waveform for the second symbol. In some examples of the method, apparatus, and non-transitory computer-readable medium described above, a bandwidth of the control information may be less than a bandwidth of the data, and wherein a sequence for the GI may be selected to correspond to the bandwidth of the control information. In some examples of the method, apparatus, and non-transitory computer-readable medium described above, the portions of the GI that correspond to bandwidth that may be outside of the control information bandwidth may be set to zero.

In some examples of the method, apparatus, and non-transitory computer-readable medium described above, the first symbol may be a control symbol and a second symbol of the first subset of symbols may be a reference signal symbol. Some examples of the method, apparatus, and non-transitory computer-readable medium described above may further include processes, features, means, or instructions for identifying control information to be transmitted in the first symbol. Some examples of the method, apparatus, and non-transitory computer-readable medium described above may further include processes, features, means, or instructions for inserting a cyclic prefix before the control information. Some examples of the method, apparatus, and non-transitory computer-readable medium described above may further include processes, features, means, or instructions for performing the DFT-s-FDM procedure on the control information. Some examples of the method, apparatus, and non-transitory computer-readable medium described above may further include processes, features, means, or instructions for identifying a DMRS to be transmitted in the reference signal symbol. Some examples of the method, apparatus, and non-transitory computer-readable medium described above may further include processes, features, means, or instructions for reducing a length of the DMRS sequence by an amount corresponding to a length of the GI. Some examples of the method, apparatus, and non-transitory computer-readable medium described above may further include processes, features, means, or instructions for appending the GI to the reduced-length DMRS sequence. Some examples of the method, apparatus, and non-transitory computer-readable medium described above may further include processes, features, means, or instructions for performing the DFT-s-FDM procedure on the DMRS and GI.

In some examples of the method, apparatus, and non-transitory computer-readable medium described above, the first symbol may have a different waveform than the reference signal symbol and the second subset of symbols. In some examples of the method, apparatus, and non-transitory computer-readable medium described above, the reference signal symbol provides a sequence to enable phase tracking of a transmission beam used to transmit the first waveform and the second waveform.

In some examples of the method, apparatus, and non-transitory computer-readable medium described above, a DFT window size used in the DFT-s-FDM procedure performed on the control information, and DMRS and GI, may be different than a DFT window size used in the DFT-s-FDM procedure performed on the data and GI when generating the second waveform for the second symbol.

Some examples of the method, apparatus, and non-transitory computer-readable medium described above may further include processes, features, means, or instructions for receiving K data samples. Some examples of the method, apparatus, and non-transitory computer-readable medium described above may further include processes, features, means, or instructions for appending L GI samples to the K data samples to provide an appended set of K+L samples. Some examples of the method, apparatus, and non-transitory computer-readable medium described above may further include processes, features, means, or instructions for performing a discrete Fourier transform (DFT) of a size K+L on the appended data and GI samples. Some examples of the method, apparatus, and non-transitory computer-readable medium described above may further include processes, features, means, or instructions for toning mapping an output of the DFT to N tones. Some examples of the method, apparatus, and non-transitory computer-readable medium described above may further include processes, features, means, or instructions for performing an inverse DFT (IDFT) of a size N on the output of the DFT to generate a time domain signal having N samples.

DETAILED DESCRIPTION

Figure 1:
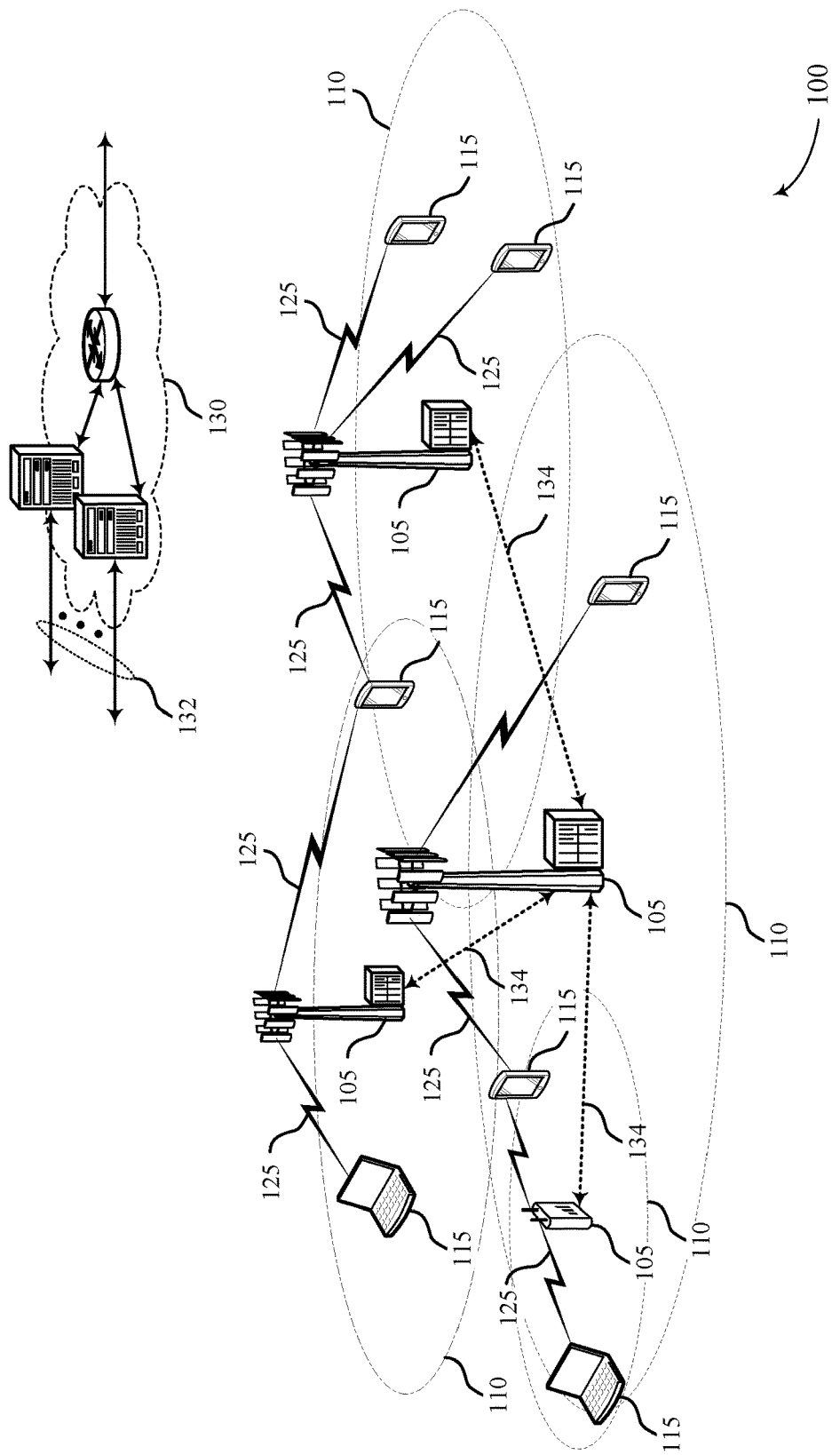
FIG. 1 illustrates an example of a system for wireless communication that supports slot structure design using guard intervals in a single carrier waveform in accordance with aspects of the present disclosure.

A wireless communications system may support communication between a base station and a user equipment (UE). Specifically, the wireless communications system may support downlink transmissions from the base station to the UE and uplink transmissions from the UE to the base station. Uplink transmissions may include data, control signals, reference signals, etc., and different streams may be multiplexed over a set of frequency resources (i.e., frequency division multiplexing (FDM)) for an uplink transmission. For example, a UE may identify respective single-carrier streams of reference signals and data to be transmitted to a base station, and these streams may be multiplexed using FDM. In such cases, the peak-to-average power ratio (PAPR) or a frequency domain energy variation of the uplink transmission including the multiplexed streams may be high, and may result in reduced throughput in a wireless communication system.

Some UEs may support efficient techniques disclosed herein for providing control, reference signal, and data transmissions with a relatively low PAPR and frequency domain energy variation, for use in uplink transmissions to a base station. For example, a UE may identify subsets of symbols in a transmission slot, a first subset of which may be used for control or reference signal transmissions, and a second subset of which may be used for data transmissions. A first waveform may be used for the first subset of symbols, and a second waveform may be used for data to be transmitted in the second subset of symbols. A combination waveform may be generated based on the first and second waveforms that is transmitted to a receiver. In some examples, the combination waveform may be generated by concatenating the first and second waveforms. The first waveform may be generated, in some examples, based on whether the first subset of symbols includes control information, a reference signal, or combinations thereof.

In some cases, a first symbol of the first subset of symbols may include a demodulation reference signal (DMRS), and the first waveform may be generated by appending a guard interval (GI) sequence to the DMRS, and performing a discrete Fourier transform spread frequency division multiplexing (DFT-s-FDM) procedure on the DMRS and GI. The second waveform may be generated by appending the GI to data to be transmitted in each symbol of the second subset of symbols, and performing the DFT-s-FDM procedure on the data and GI. In some cases, a DFT size may be the same for both the first subset of symbols and the second subset of symbols. In other cases, the DFT size may be different for the first subset of symbols and the second subset of symbols. In some cases, control information may be transmitted in one or more symbols of the first subset of symbols, and the GI may be appended to the control information and the DFT-s-FDM procedure performed on the control information and GI. These techniques may help to ensure that signals included in an uplink transmission may provide good signals for channel estimation and provide desirable channel characteristics such as a peak-to-average-power ratio (PAPR) and frequency domain energy variation that are relatively low.

Aspects of the disclosure are initially described in the context of a wireless communications system. Various examples of slot structures are then described. Aspects of the disclosure are further illustrated by and described with reference to apparatus diagrams, system diagrams, and flowcharts that relate to slot structure design using guard intervals in a single carrier waveform.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. UEs 115 and base stations 105 may use slot structures with GIs in single carrier waveforms, as described herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
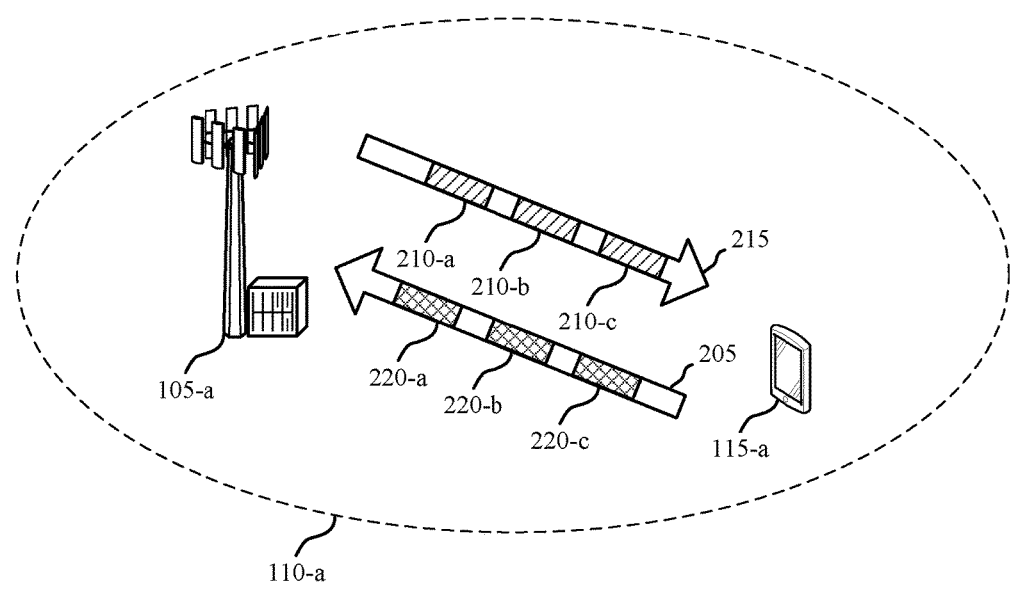
FIG. 2 illustrates an example of a wireless communication system that supports slot structure design using guard intervals in a single carrier waveform in accordance with aspects of the present disclosure.

FIG. 2 illustrates an example of a wireless communication system 200 that supports slot structure design using guard intervals in a single carrier waveform in accordance with various aspects of the present disclosure. Wireless communication system 200 includes base station 105-a and UE 115-a, which may be examples of aspects of a UE 115 and base station 105 as described above with reference to FIG. 1. In the example of FIG. 2, the wireless communication system 200 may operate according to a radio access technology (RAT) such as a LTE, 5G, or NR RAT, although techniques described herein may be applied to any RAT and to systems that may concurrently use two or more different RATs.

Base station 105-a may communicate with UE 115-a over an uplink carrier 205 and a downlink carrier 215. In some examples, base station 105-a may allocate resources for communication with UEs over uplink carrier 205 and downlink carrier 215 and transmit downlink transmissions 210 via downlink carrier 215 and receive uplink transmissions 220 via uplink carrier 205. In some cases, the uplink transmissions 220 may include data, control information, reference signal transmissions, or any combination thereof. In some cases, uplink transmissions 220 may include multiple subframes 210-a, 210-b, and 210-c, which may each include two slots. In some cases, each slot may be segmented into a set of symbols. As discussed above, when transmitting uplink transmissions 220, a single carrier waveform may be used, which may be generated by performing a DFT-s-FDM procedure on a series of samples corresponding to a transmission for the slot. In some examples, a GI may be added to data, control, or reference signals to be transmitted in a slot, and the DFT-s-FDM procedure may be performed following the addition of the GI. The GI may be, for example, a sequence that may be selected to provide a relatively low PAPR. An example of such a procedure is illustrated in FIG. 3, and will be discussed in more detail below.

In some cases, a first subset of symbols of a slot may be identified for control or reference signal transmissions, and a second subset of symbols of the slot may be identified for data transmissions. For example, a first symbol of the first subset of symbols may include a DMRS. In such a case, the UE 115-a may generate a first waveform by appending the GI sequence to the DMRS, and performing the DFT-s-FDM procedure on the DMRS and GI. The UE 115-a may generate a second waveform for the second subset of slots by appending the GI to data to be transmitted in each symbol of the second subset of symbols, and performing the DFT-s-FDM procedure on the data and GI. In some cases, a DFT size may be the same for both the first subset of symbols and the second subset of symbols. In other cases, the DFT size may be different for the first subset of symbols and the second subset of symbols. In some cases, control information may be transmitted in one or more symbols of the first subset of symbols, and the GI may be appended to the control information and the DFT-s-FDM procedure performed on the control information and GI. These techniques may help to ensure that signals included in an uplink transmission may provide good signals for channel estimation and provide desirable channel characteristics such as a PAPR and frequency domain energy variation that are relatively low. In some cases, the GI may be selected to provide a PAPR and frequency domain energy variation that are below a threshold value.

Figure 3:
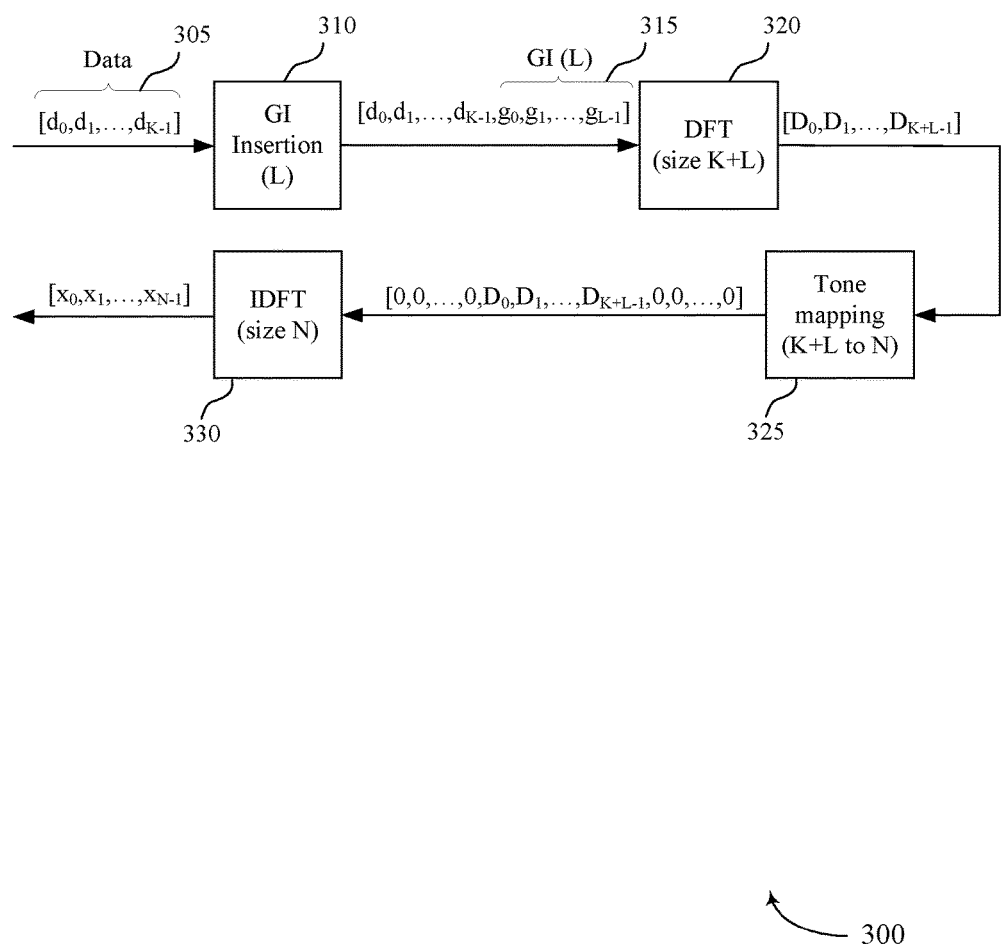
FIG. 3 illustrates an example of a DFT-s-FDM technique that supports slot structure design using guard intervals in a single carrier waveform in accordance with aspects of the present disclosure.

FIG. 3 illustrates an example of a DFT-s-FDM technique 300 that supports slot structure design using guard intervals in a single carrier waveform in accordance with various aspects of the present disclosure. In some examples, DFT-s-FDM technique 300 may be implemented by a UE 115 such as described in FIGS. 1 and 2. In the example of FIG. 3, the DFT-s-FDM technique 300 may be performed on an incoming data stream, but the various processing of the DFT-s-FDM technique 300 may be performed on other incoming samples, such as control information samples, DMRS samples, or combinations thereof, as will be discussed in more detail below.

In this example, a series of data samples 305 may be provided, which in this case may include K time domain data samples 305. A GI insertion function 310 may append a GI sequence to the data samples, such that a series of time domain GI samples 315 are appended to the data samples 305. In this example, L time domain GI samples are appended to the data samples 305. A DFT function 320 may be performed on the data and GI samples, which may output K+L samples in the frequency domain, indicated as $[D_0, D_1, \ldots, D_{K+L-1}]$ in FIG. 3. Following the DFT function 320, tone mapping 325 may be performed to map the K+L frequency domain samples to N frequency tones. The N frequency tones may then be provided to an inverse DFT (IDFT) function 330, of size N, to generate N time domain samples of the data and the appended GI.

Figure 4:
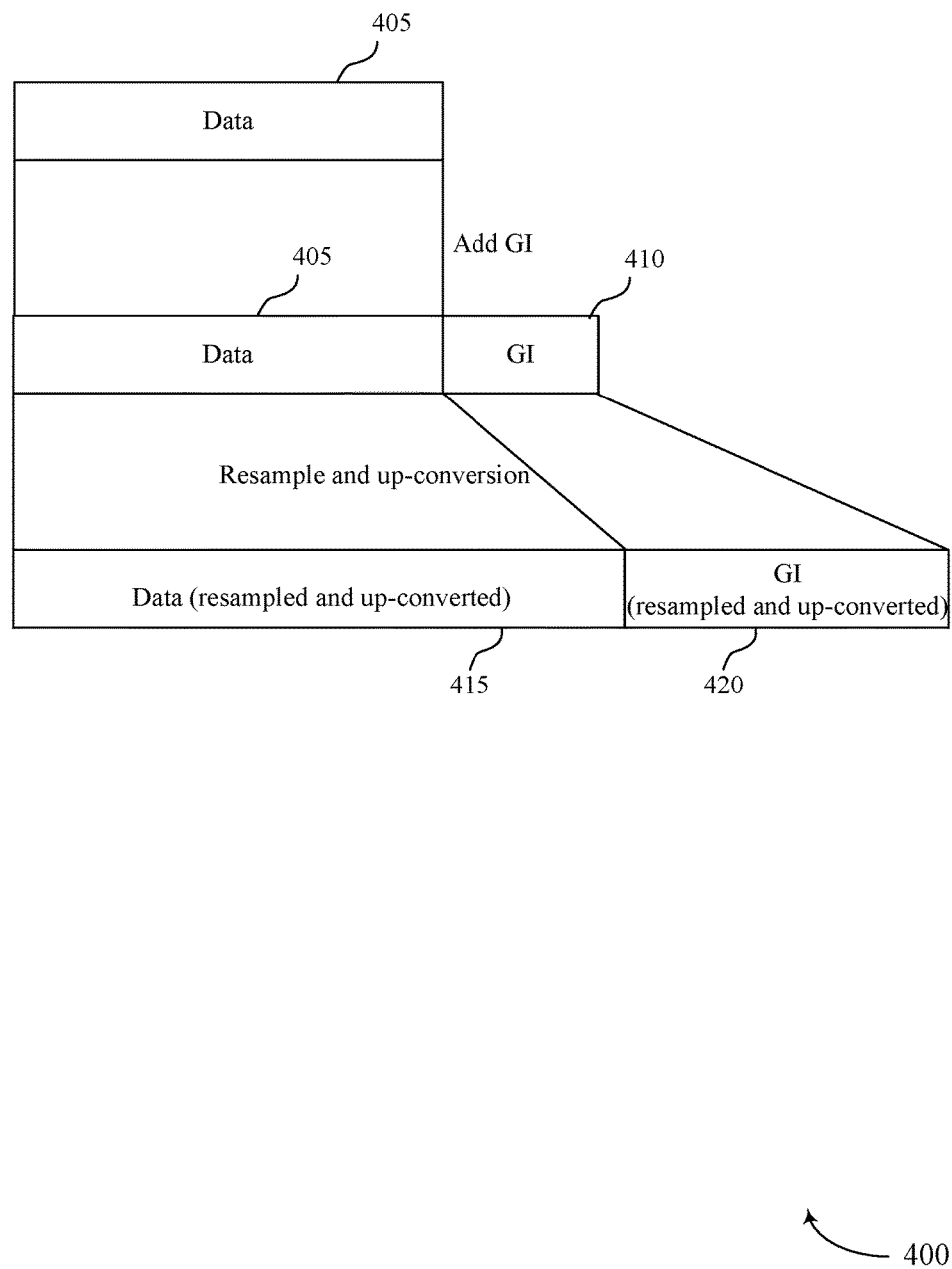
FIG. 4 illustrates a time domain example of the DFT-s-FDM technique that supports slot structure design using guard intervals in a single carrier waveform in accordance with aspects of the present disclosure.

FIG. 4 illustrates a time domain example of the DFT-s-FDM technique 400 that supports slot structure design using guard intervals in a single carrier waveform in accordance with various aspects of the present disclosure. In some examples, DFT-s-FDM technique 400 may be implemented by a UE 115 such as described in FIGS. 1 and 2. In this example, a set of data samples 405 (e.g., time domain data) may be received, such as at a waveform generator of a UE. A GI 410 may be appended to the data 405. In some cases, the GI 410 may be a sequence that is selected to have desirable channel characteristics, such as a relatively low PAPR and relatively low frequency domain energy variation across frequency tones. The time domain data 405 and GI 410 samples may be resampled and up-converted, such as through a DFT, tone mapping, and an IDFT such as discussed with respect to FIG. 3, to generate time domain samples of resampled and up-converted data 415 and resampled and up-converted GI 420. These time domain samples may be provided to a transmission function for uplink transmissions.

Figure 5:
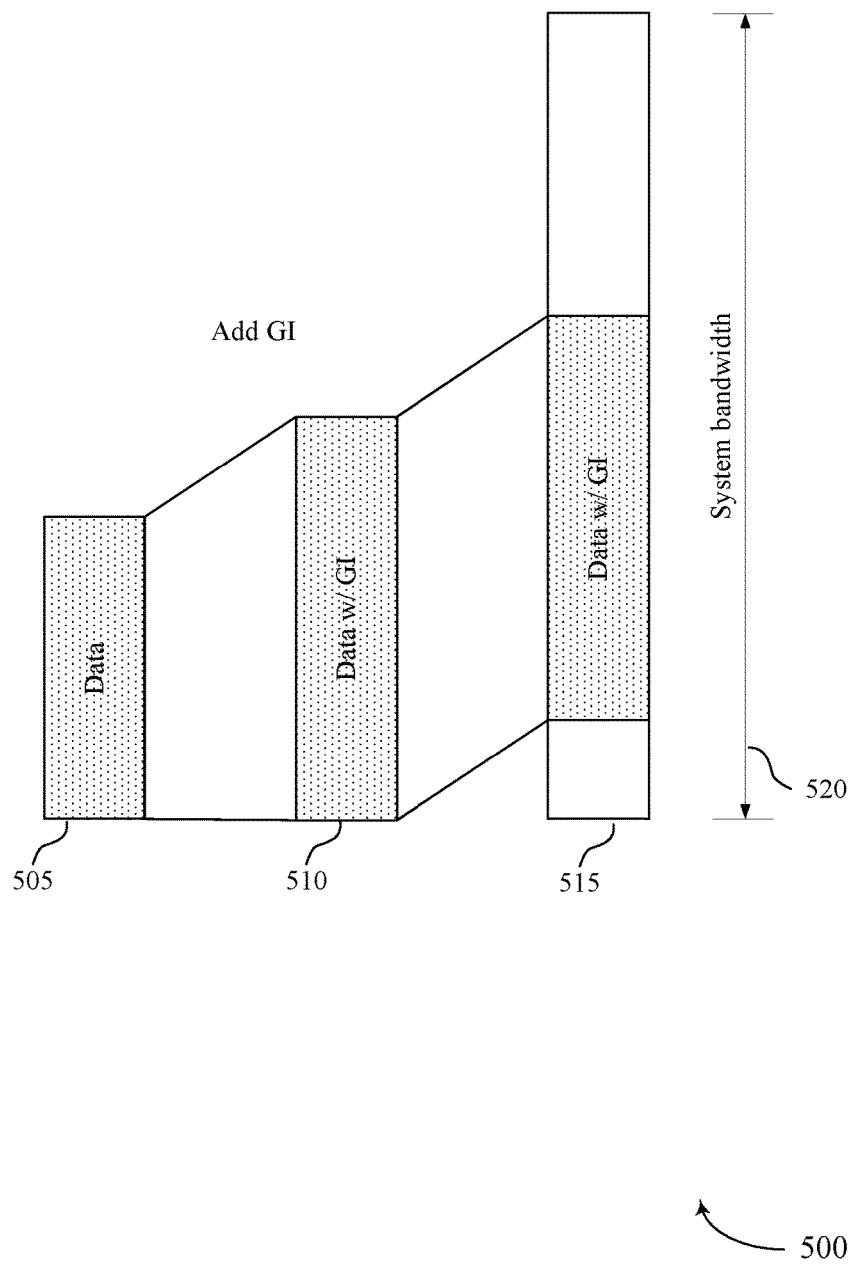
FIG. 5 illustrates a frequency domain example of the DFT-s-FDM technique that supports slot structure design using guard intervals in a single carrier waveform in accordance with aspects of the present disclosure.

FIG. 5 illustrates a frequency domain example of the DFT-s-FDM technique 500 that supports slot structure design using guard intervals in a single carrier waveform in accordance with various aspects of the present disclosure. In some examples, DFT-s-FDM technique 500 may be implemented by a UE 115 such as described in FIGS. 1 and 2. This example shows the DFT-s-FDM procedure in a frequency domain, in which a set of data samples 505 may be received, such as at a waveform generator of a UE. A GI may be appended to the data 505 and a DFT function performed to provide frequency samples of data with GI 510. Tone mapping may be performed on the frequency samples of data with GI 510 to provide tones 515 that span a system bandwidth 520.

Figure 6:
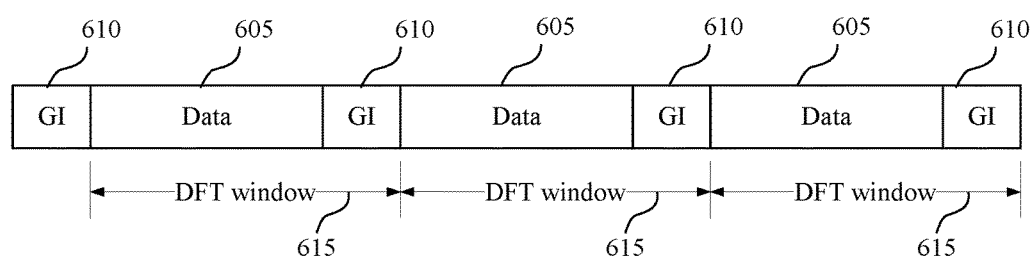
FIGS. 6 through 11 illustrates examples of slot structure designs using guard intervals in a single carrier waveform in accordance with aspects of the present disclosure.

FIG. 6 illustrates an example of a slot structure design 600 using guard intervals in a single carrier waveform in accordance with various aspects of the present disclosure. In some examples, slot structure design 600 may be implemented by a UE 115 such as discussed above with respect to FIGS. 1 and 2. In this example, a continuous sequence of data symbols may be provided for a slot transmission, in which data samples 605 may have GI samples 610 appended thereto, and a DFT may be performed having a DFT window 615 size that corresponds to the data samples 605 plus the GI samples 610. An initial GI may also be prepended ahead of the first data samples 605 of a first symbol.

In this example, N is the number of data samples 605 per symbol, and L is the number of GI samples 610 per symbol. Further, K is the number of OFDM symbols in a slot. Thus, such a configuration provides a total of (N+L)K+L samples for K symbols in a slot. Because GI samples 610 are prepended to the initial data samples 605 in the initial symbol, the GI samples 610 appears in both ends of a data segment, and may support a cyclic prefix (CP) for each symbol. The prepended GI also results in an additional L samples in a slot in addition to (N+L)K samples, which may impact symbol alignment within a slot (or mini-slot of two or three symbols), depending on the number of symbols inside the slot. In some cases, reference signals, such as DMRS, and control information may be multiplexed with data, and slot structure examples for such cases are discussed below.

Figure 7:
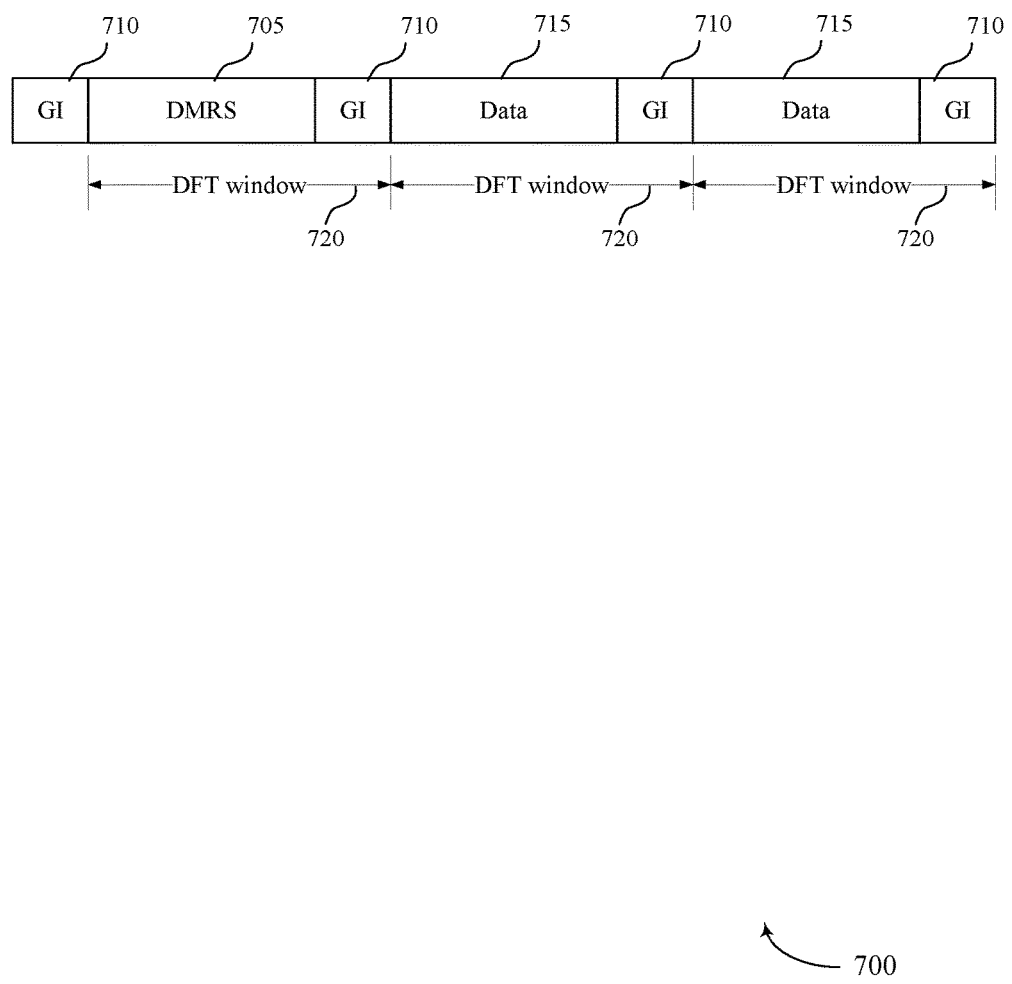

FIG. 7 illustrates an example of a slot structure design 700 using guard intervals in a single carrier waveform in accordance with various aspects of the present disclosure. In some examples, slot structure design 700 may be implemented by a UE 115 such as discussed above with respect to FIGS. 1 and 2. In this example, a DMRS 705 may be transmitted in a DMRS symbol that is front loaded as a part of the data burst or a slot. In such a case, the DMRS 705 may have may have GI samples 710 appended thereto. The GI samples 710 may be the same as GI samples 710 that are appended to data samples 715 to be transmitted in one or more subsequent symbols within the slot.

In this example, a DFT may be performed having a DFT window 720 size that is the same across the DMRS symbol and the data symbols. For example, the DFT window 720 size may correspond to the data samples 715 plus the GI samples 710, and the DMRS 705 and GI samples 710 may have a same length, such that the DFT window 720 covers the DMRS 705 and GI samples 710. The concatenation of DMRS 705 and GI samples 710 may combine to form the DMRS for channel estimation, and thus the GI samples 710 in such cases actually form the last part of the DMRS sequence. In some examples, the DMRS 705 and GI samples 710 may be selected such that they together provide desired time/frequency domain properties. In some examples, the combined DMRS and GI may form a Zadoff-Chu (ZC) sequence having relatively flat frequency domain characteristics, which may provide for enhanced channel estimation at a receiver such as a base station that may perform channel estimation for uplink transmissions. A slot structure such as in FIG. 7 thus provides uniform size DFT windows 720. In some examples, a slot may be divided into 15 symbols of the same size, resulting in a frequency tone subcarrier spacing (SCS) that corresponds with NR SCS. In this example, GI samples 710 are also prepended to the DMRS 705 such that this initial GI sequence extends to the previous symbol or slot. In some cases, implementations that use slot structures as discussed herein may operate in mmW frequencies in shared spectrum, where transmissions are bursty in nature and relatively few transmissions may be continuous such that a DMRS symbol is transmitted immediately following another slot transmission by the same transmitter.

Figure 8:
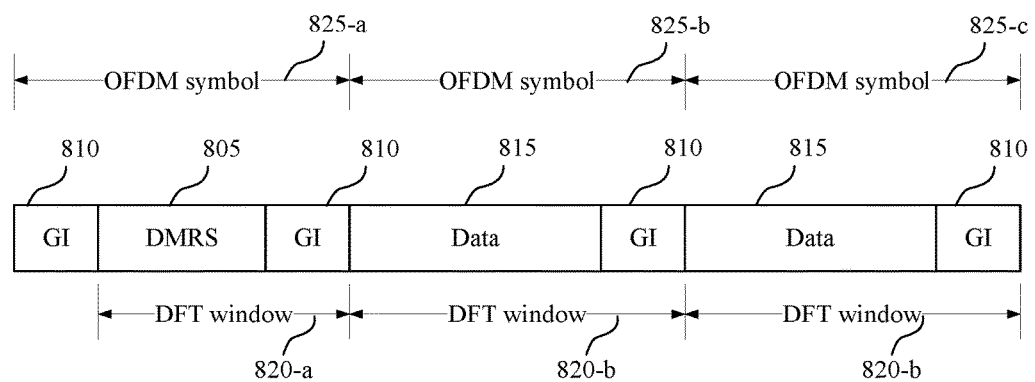

FIG. 8 illustrates an example of a slot structure design 800 using guard intervals in a single carrier waveform in accordance with various aspects of the present disclosure. In some examples, slot structure design 800 may be implemented by a UE 115 such as discussed above with respect to FIGS. 1 and 2. In this example, a DMRS 805 may be transmitted in a DMRS symbol that is an initial OFDM symbol 825-*a* of a data burst or a slot. In this example, the DMRS 805 may have a reduced length such that GI sequences prepended and appended to the DMRS 805 fit within the initial OFDM symbol 825-*a*.

The GI samples 810 may be the same as GI samples 810 that are appended to data samples 815 to be transmitted in subsequent OFDM symbols 825-*b* and 825-*c*. In this example, due to the reduced length DMRS 805, a first DFT window 820-*a* may be smaller than a second DFT window 820-*b* for the subsequent OFDM symbols 825-*b* and 825-*c*. In such cases, due to the smaller DFT window 820-*a*, a base station may convert the estimated channel to the subcarrier spacing corresponding to the second DFT window 820-*b* (i.e., the channel is estimated at a larger SCS, and digital signal processing may convert the channel estimation to a channel estimation of the SCS used for data samples 815). In some cases that may use time domain channel estimation, time domain zero padding may be provided to the DMRS to perform the conversion. By providing the reduced length DMRS 805, all of the OFDM symbols 825 are self-contained, and thus amenable to continuous transmission with other transmission slots.

Figure 9:
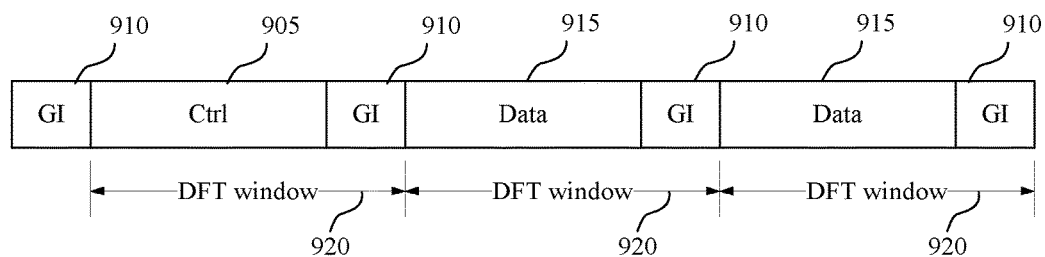

FIG. 9 illustrates an example of a slot structure design 900 using guard intervals in a single carrier waveform in accordance with various aspects of the present disclosure. In some examples, slot structure design 900 may be implemented by a UE 115 such as discussed above with respect to FIGS. 1 and 2. In this example, control information 905 may be transmitted in a control information symbol that is front loaded as a part of the data burst or a slot. In such a case, the control information 905 may have may have GI samples 910 appended thereto. The GI samples 910 may be the same as GI samples 910 that are appended to data samples 915 to be transmitted in one or more subsequent symbols within the slot.

In this example, a DFT may be performed having a DFT window 920 size that is the same across the control information symbol and the data symbols. For example, the DFT window 920 size may correspond to the data samples 915 plus the GI samples 910, and the control information 905 and GI samples 910 may have a same length, such that the DFT window 920 covers the control information 905 and GI samples 910. In this example, the control bandwidth may be the same as a data symbol bandwidth.

Figure 10:
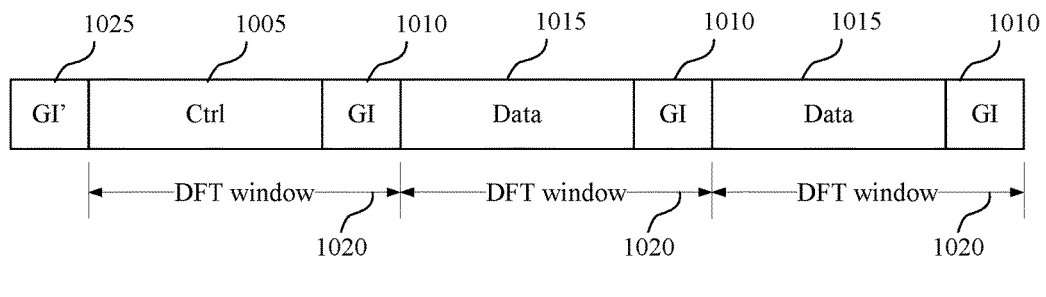

FIG. 10 illustrates an example of a slot structure design 1000 using guard intervals in a single carrier waveform in accordance with various aspects of the present disclosure. In some examples, slot structure design 1000 may be implemented by a UE 115 such as discussed above with respect to FIGS. 1 and 2. In this example, control information 1005 may be transmitted in a control information symbol that is front loaded as a part of the data burst or a slot. In such a case, the control information 1005 may have GI samples 1010 appended thereto. The GI samples 1010 may be the same as GI samples 1010 that are appended to data samples 1015 to be transmitted in one or more subsequent symbols within the slot.

In this example, a DFT may be performed having a DFT window 1020 size that is the same across the control information symbol and the data symbols. For example, the DFT window 1020 size may correspond to the data samples 1015 plus the GI samples 1010, and the control information 1005 and GI samples 1010 may have a same length, such that the DFT window 1020 covers the control information 1005 and GI samples 1010. In this example, the control bandwidth may be narrower than the data symbol bandwidth. For example, resources for control information 1005 may be shared by multiple UEs configured to monitor different data bandwidth. In such cases, a modified GI, referred to as GI' 1025, may be prepended to the control information 1005. In some cases, GI' 1025 may be the same as GI samples 1010, but restricted to only the subband occupied by the control information 1005. Thus, GI' 1025 is the same as the part of GI samples 1010 in the subband covered by GI' 1025.

Figure 11:
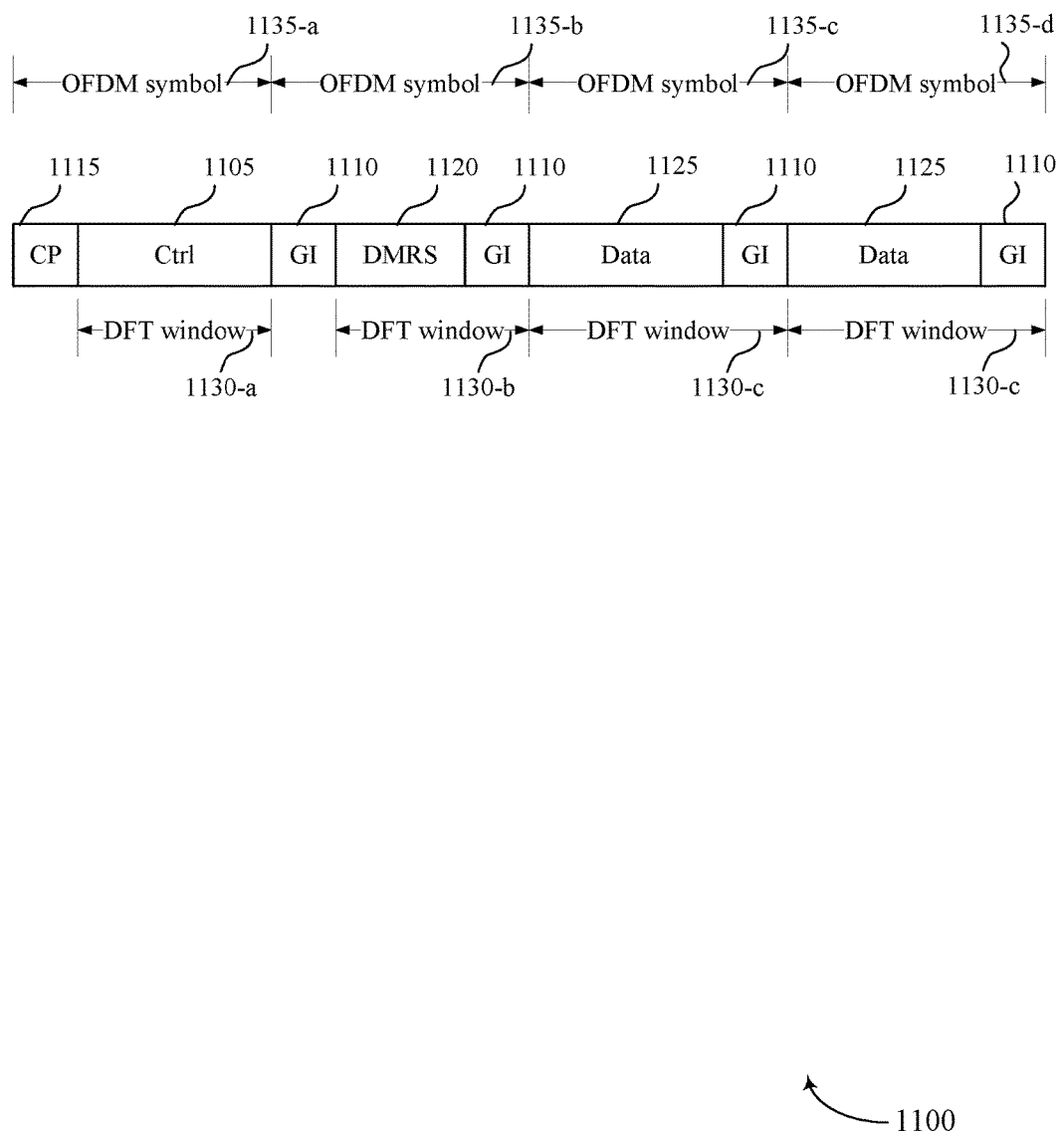

FIG. 11 illustrates an example of a slot structure design 1100 using guard intervals in a single carrier waveform in accordance with various aspects of the present disclosure. In some examples, slot structure design 1100 may be implemented by a UE 115 such as discussed above with respect to FIGS. 1 and 2. In this example, control information 1105 may be transmitted in an control information OFDM symbol 1135-*a*, and a DMRS 1120 may be transmitted in a DMRS OFDM symbol 1135-*b*, which may be front loaded as the first two OFDM symbols 1135 of a data burst or a slot, which may be followed by data OFDM symbols 1135-*c* and 1135-*d*.

In this example, the control information 1105 may follow a CP 1115 in the control information OFDM symbol 1135-*a*. The DMRS 1120 may be prepended and appended with GI samples 1110 in the DMRS OFDM symbol 1135-*b*. The GI samples 1110 may be the same as GI samples 1110 that are appended to data samples 1125 to be transmitted in the data OFDM symbols 1135-*c* and 1135-*d*. In this example, a DFT may be performed on the control information 1105 having a DFT window 1130-*a* that is a same size as DFT window 1130-*b* that is used for the DMRS 1120 and GI samples 1110 of the DMRS OFDM symbol 1135-*b*. The data OFDM symbols 1135-*c* and 1135-*d* may use DFT window 1130-*c* that has a size that corresponds to the data samples 1125 and the GI samples 1110.

In some cases, the GI samples 1110 may be used to provide phase tracking in mmW transmissions, and the control information 1105 may not need phase tracking because it will last for a number of OFDM symbols. In such cases, the GI samples 1110 may not be used for the control information OFDM symbol 1135-*a*, which may simply use CP 1115, as the DMRS OFDM symbol 1135-*b* may provide sufficient phase reference. Furthermore, in cases where there are multiple control OFDM symbols, the OFDM symbols may not be using the same beam, and thus phase tracking would not be necessary. Thus, a slot with such symbols 1135 may have a mixed waveform design with control and data regions that are self-contained in time in different OFDM symbols. In some cases, such a mixed waveform may be provided in conjunction with a slot structure such as discussed with reference to FIG. 7. Further, in some cases, the DFT window 1130-*a* for the control information 1105 may be the same size as the DFT window 1130-*b* of the DMRS OFDM symbol 1135-*b*.

Figure 12:
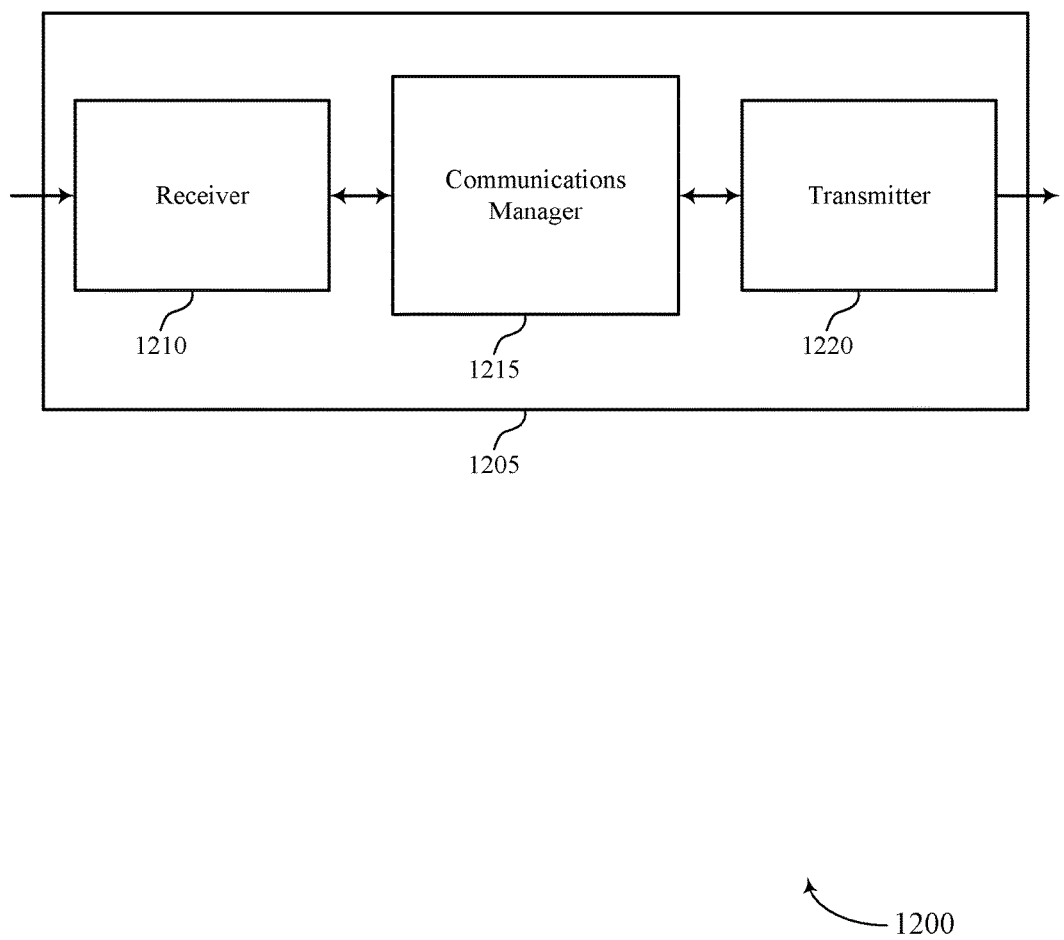
FIGS. 12 through 14 show block diagrams of a device that supports slot structure design using guard intervals in a single carrier waveform in accordance with aspects of the present disclosure.

FIG. 12 shows a block diagram 1200 of a wireless device 1205 that supports slot structure design using guard intervals in a single carrier waveform in accordance with aspects of the present disclosure. Wireless device 1205 may be an example of aspects of a user equipment (UE) 115 or base station 105 as described herein. Wireless device 1205 may include receiver 1210, communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to slot structure design using guard intervals in a single carrier waveform, etc.). Information may be passed on to other components of the device. The receiver 1210 may be an example of aspects of the transceiver 1535 described with reference to FIG. 15. The receiver 1210 may utilize a single antenna or a set of antennas.

Communications manager 1215 may be an example of aspects of the communications manager 1515 described with reference to FIG. 15.

Communications manager 1215 and/or at least some of its various sub-components may be implemented in hardware, software executed by a processor, firmware, or any combination thereof. If implemented in software executed by a processor, the functions of the communications manager 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 1215 and/ or at least some of its various sub-components may be physically located at various positions, including being distributed such that portions of functions are implemented at different physical locations by one or more physical devices. In some examples, communications manager 1215 and/or at least some of its various sub-components may be a separate and distinct component in accordance with various aspects of the present disclosure. In other examples, communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1215 may segment a transmission slot into a set of symbols, identify a first subset of the set of symbols and a second subset of the set of symbols, generate a first waveform for a first symbol of the first subset of symbols based on whether the first symbol contains control information or reference signal transmissions, generate a second waveform for a second symbol of the second subset of symbols by appending a GI to a set of samples containing the data to be transmitted in the second symbol and performing a DFT-s-FDM procedure on the data and GI, generate a combination waveform based on the first subset of symbols and the second subset of symbols, and transmit the combination waveform to a receiver.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
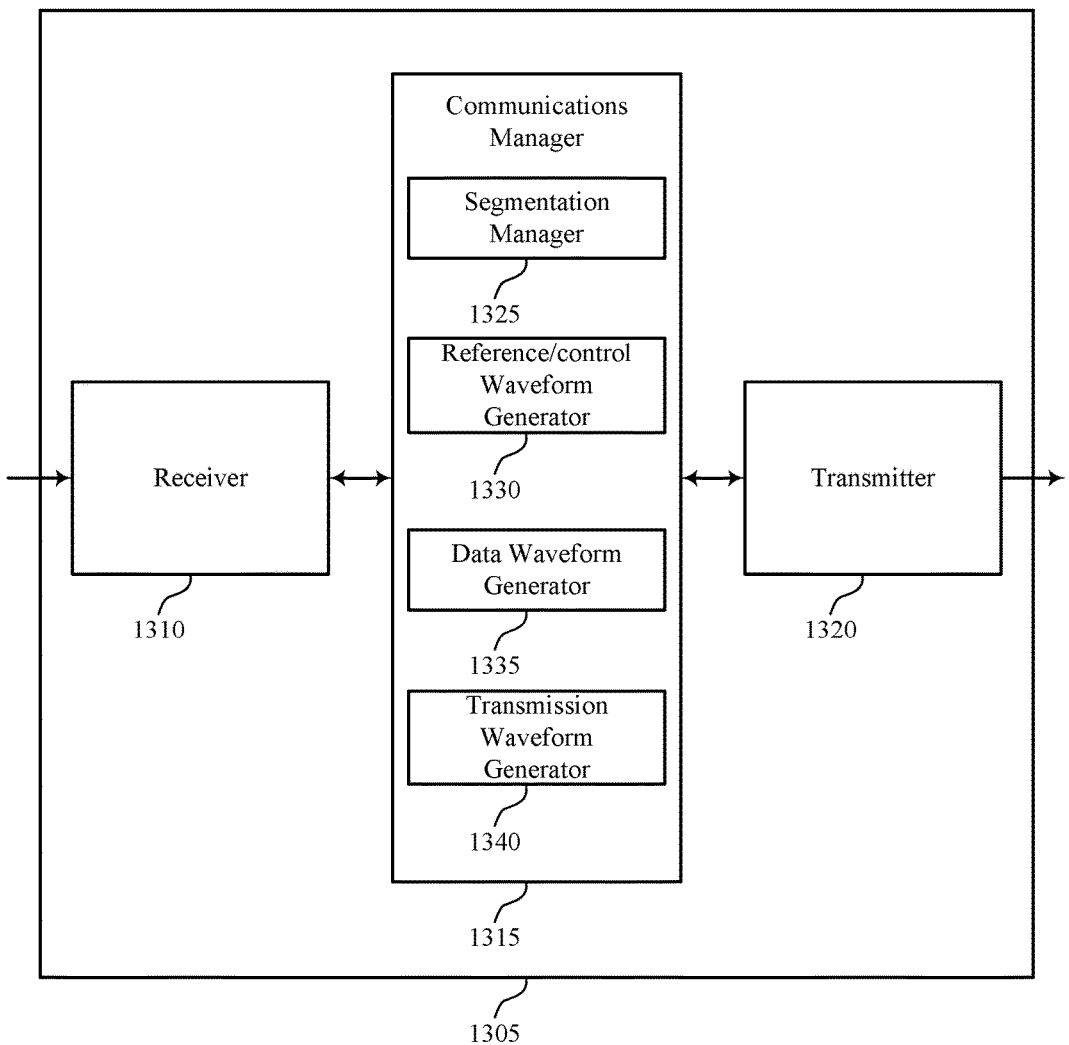

FIG. 13 shows a block diagram 1300 of a wireless device 1305 that supports slot structure design using guard intervals in a single carrier waveform in accordance with aspects of the present disclosure. Wireless device 1305 may be an example of aspects of a wireless device 1205 or a UE 115 or base station 105 as described with reference to FIG. 12. Wireless device 1305 may include receiver 1310, communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to slot structure design using guard intervals in a single carrier waveform, etc.). Information may be passed on to other components of the device. The receiver 1310 may be an example of aspects of the transceiver 1535 described with reference to FIG. 15. The receiver 1310 may utilize a single antenna or a set of antennas.

Communications manager 1315 may be an example of aspects of the communications manager 1515 described with reference to FIG. 15. Communications manager 1315 may also include segmentation manager 1325, reference/control waveform generator 1330, data waveform generator 1335, and transmission waveform generator 1340.

Segmentation manager 1325 may segment a transmission slot into a set of symbols and identify a first subset of the set of symbols and a second subset of the set of symbols. In some cases, the first subset of symbols is for one or more of control information or reference signal transmission, and the second subset of symbols is for data transmission.

Reference/control waveform generator 1330 may generate waveforms for control information symbols, reference signal transmission symbols, or combinations thereof. In some cases, reference/control waveform generator 1330 may identify a DMRS to be transmitted in the first symbol, append a GI to the DMRS, and perform the DFT-s-FDM procedure on the DMRS and GI. In some cases, a DFT window size used in the DFT-s-FDM procedure performed on the DMRS and GI is set to be a same DFT window size as for the DFT-s-FDM procedure performed on the data and GI when generating a second waveform for a second symbol for data transmission. In some cases, the generating the first waveform includes identifying a DMRS to be transmitted in the first symbol, reducing a length of the DMRS sequence by an amount corresponding to a first length of the GI, appending the GI to the reduced-length DMRS sequence, prepending a second GI to the reduced-length DMRS sequence, where the prepended GI has a second length at least as long as the first GI length, and a GI sequence of the appended GI is a same sequence as an ending portion of the prepended GI, and where a length of concatenation of the prepended GI, the DMRS, and the appended GI, equals a symbol length of each symbol of the set of symbols, and performing the DFT-s-FDM procedure on the DMRS and GIs. In some cases, the appended GI has the same sequence as the ending portion of the prepended GI to form a cyclic shift. In some cases, the second length is longer than the first length in order to provide a DMRS plus appended GI with a DFT window size that corresponds to other DFT window sizes used in the second subset of symbols. In some cases, a DFT window size used in the DFT-s-FDM procedure performed on the DMRS and GI is shorter than a DFT window size used in the DFT-s-FDM procedure performed on the data and GI when generating the second waveform for the second symbol.

In some cases, the generating the first waveform includes identifying control information to be transmitted in the first symbol, appending the GI to the control information, and performing the DFT-s-FDM procedure on the control information and GI. In some cases, a DFT window size used in the DFT-s-FDM procedure performed on the control information and GI is set to be a same DFT window size as for the DFT-s-FDM procedure performed on the data and GI when generating the second waveform for the second symbol. In some cases, the first symbol is a control symbol and a second symbol of the first subset of symbols is a reference signal symbol, and where the generating the first waveform includes identifying control information to be transmitted in the first symbol, inserting a cyclic prefix before the control information, performing the DFT-s-FDM procedure on the control information, identifying a DMRS to be transmitted in the reference signal symbol, reducing a length of the DMRS sequence by an amount corresponding to a length of the GI, appending the GI to the reduced-length DMRS sequence, and performing the DFT-s-FDM procedure on the DMRS and GI. In some cases, the first symbol has a different waveform than the reference signal symbol and the second subset of symbols. In some cases, the reference signal symbol provides a sequence to enable phase tracking of a transmission beam used to transmit the first waveform and the second waveform. In some cases, a DFT window size used in the DFT-s-FDM procedure performed on the control information, and DMRS and GI, is different than a DFT window size used in the DFT-s-FDM procedure performed on the data and GI when generating the second waveform for the second symbol. In some cases, the generating the second waveform includes receiving K data samples, appending L GI samples to the K data samples to provide an appended set of K+L samples, performing a DFT of a size K+L on the appended data and GI samples, tone mapping an output of the DFT to N tones, and performing an IDFT of a size N on the output of the DFT to generate a time domain signal having N samples.

Data waveform generator 1335 may generate a second waveform for a second symbol of the second subset of symbols by appending a GI to a set of samples containing the data to be transmitted in the second symbol and performing a DFT-s-FDM procedure on the data and GI.

Transmission waveform generator 1340 may generate a combination waveform based on the first subset of symbols and the second subset of symbols and transmit the combination waveform to a receiver. In some cases, the generating the combination waveform includes concatenating the waveforms for the first subset of symbols and the second subset of symbols.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
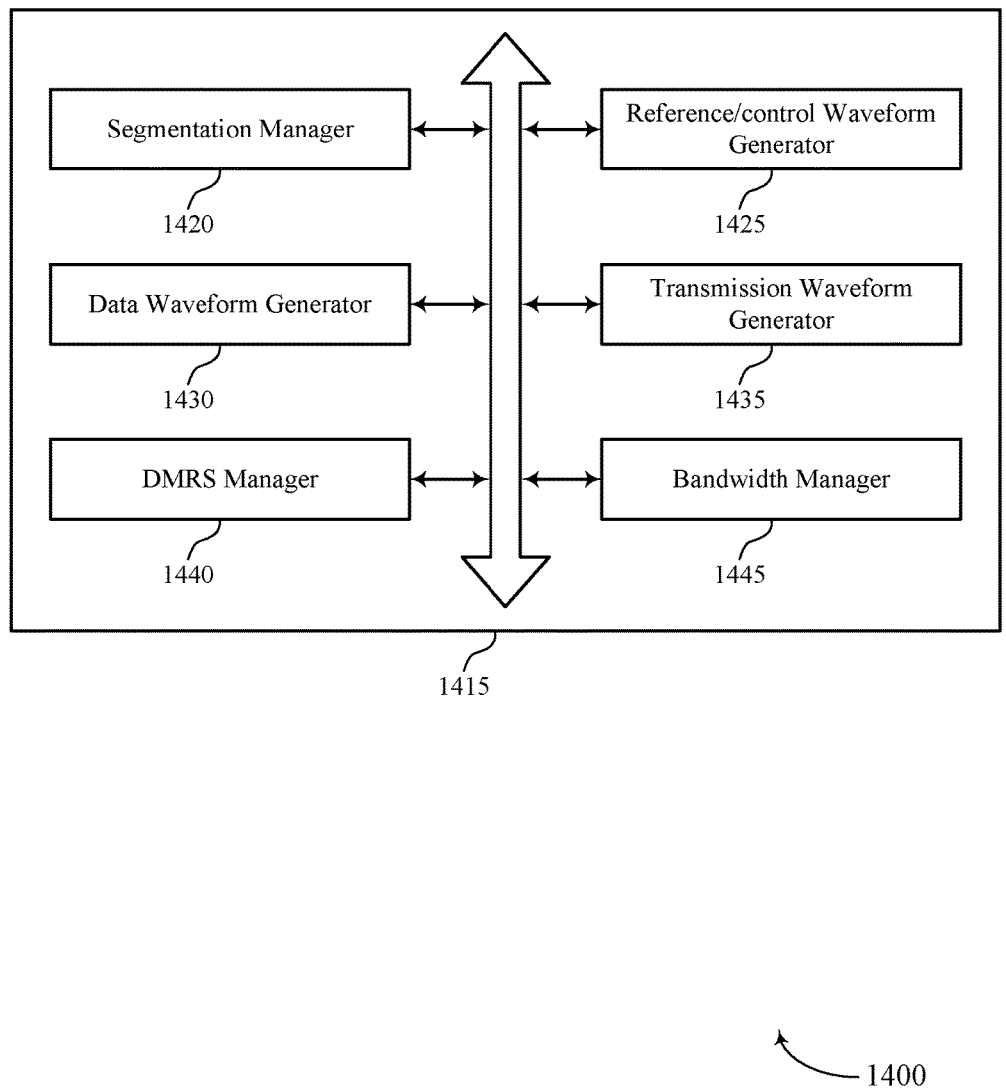

FIG. 14 shows a block diagram 1400 of a communications manager 1415 that supports slot structure design using guard intervals in a single carrier waveform in accordance with aspects of the present disclosure. The communications manager 1415 may be an example of aspects of a communications manager 1215, a communications manager 1315, or a communications manager 1515 described with reference to FIGS. 12, 13, and 15. The communications manager 1415 may include segmentation manager 1420, reference/control waveform generator 1425, data waveform generator 1430, transmission waveform generator 1435, DMRS manager 1440, and bandwidth manager 1445. Each of these modules may communicate, directly or indirectly, with one another (e.g., via one or more buses).

Segmentation manager 1420 may segment a transmission slot into a set of symbols and identify a first subset of the set of symbols and a second subset of the set of symbols. In some cases, the first subset of symbols is for one or more of control information or reference signal transmission, and the second subset of symbols is for data transmission.

Reference/control waveform generator 1425 may generate waveforms for control information symbols, reference signal transmission symbols, or combinations thereof. In some cases, reference/control waveform generator 1425 may identify a DMRS to be transmitted in the first symbol, append a GI to the DMRS, and perform the DFT-s-FDM procedure on the DMRS and GI. In some cases, a DFT window size used in the DFT-s-FDM procedure performed on the DMRS and GI is set to be a same DFT window size as for the DFT-s-FDM procedure performed on the data and GI when generating a second waveform for a second symbol for data transmission. In some cases, the generating the first waveform includes identifying a DMRS to be transmitted in the first symbol, reducing a length of the DMRS sequence by an amount corresponding to a first length of the GI, appending the GI to the reduced-length DMRS sequence, prepending a second GI to the reduced-length DMRS sequence, where the prepended GI has a second length at least as long as the first GI length, and a GI sequence of the appended GI is a same sequence as an ending portion of the prepended GI, and where a length of concatenation of the prepended GI, the DMRS, and the appended GI, equals a symbol length of each symbol of the set of symbols, and performing the DFT-s-FDM procedure on the DMRS and GIs. In some cases, the appended GI has the same sequence as the ending portion of the prepended GI to form a cyclic shift. In some cases, the second length is longer than the first length in order to provide a DMRS plus appended GI with a DFT window size that corresponds to other DFT window sizes used in the second subset of symbols. In some cases, a DFT window size used in the DFT-s-FDM procedure performed on the DMRS and GI is shorter than a DFT window size used in the DFT-s-FDM procedure performed on the data and GI when generating the second waveform for the second symbol.

In some cases, the generating the first waveform includes identifying control information to be transmitted in the first symbol, appending the GI to the control information, and performing the DFT-s-FDM procedure on the control information and GI. In some cases, a DFT window size used in the DFT-s-FDM procedure performed on the control information and GI is set to be a same DFT window size as for the DFT-s-FDM procedure performed on the data and GI when generating the second waveform for the second symbol. In some cases, the first symbol is a control symbol and a second symbol of the first subset of symbols is a reference signal symbol, and where the generating the first waveform includes identifying control information to be transmitted in the first symbol, inserting a cyclic prefix before the control information, performing the DFT-s-FDM procedure on the control information, identifying a DMRS to be transmitted in the reference signal symbol, reducing a length of the DMRS sequence by an amount corresponding to a length of the GI, appending the GI to the reduced-length DMRS sequence, and performing the DFT-s-FDM procedure on the DMRS and GI. In some cases, the first symbol has a different waveform than the reference signal symbol and the second subset of symbols. In some cases, the reference signal symbol provides a sequence to enable phase tracking of a transmission beam used to transmit the first waveform and the second waveform. In some cases, a DFT window size used in the DFT-s-FDM procedure performed on the control information, and DMRS and GI, is different than a DFT window size used in the DFT-s-FDM procedure performed on the data and GI when generating the second waveform for the second symbol. In some cases, the generating the second waveform includes receiving K data samples, appending L GI samples to the K data samples to provide an appended set of K+L samples, performing a DFT of a size K+L on the appended data and GI samples, tone mapping an output of the DFT to N tones, and performing an IDFT of a size N on the output of the DFT to generate a time domain signal having N samples.

Data waveform generator 1430 may generate a second waveform for a second symbol of the second subset of symbols by appending a GI to a set of samples containing the data to be transmitted in the second symbol and performing a DFT-s-FDM procedure on the data and GI.

Transmission waveform generator 1435 may generate a combination waveform based on the first subset of symbols and the second subset of symbols and transmit the combination waveform to a receiver. In some cases, the generating the combination waveform includes concatenating the waveforms for the first subset of symbols and the second subset of symbols.

DMRS manager 1440 may configure the DMRS and appended GI form a reference signal usable for channel estimation at the receiver. In some cases, the DMRS and appended GI form a sequence that is selected to have a PAPR that is below a PAPR threshold value and a frequency domain energy variation across tones that is below an energy variation threshold value. In some cases, the sequence is a Zadoff-Chu sequence.

Bandwidth manager 1445 may identify transmission bandwidths. In some cases, a bandwidth of the control information is less than a bandwidth of the data, and where a sequence for the GI is selected to correspond to the bandwidth of the control information. In some cases, a portion of the GI that corresponds to bandwidth that is outside of the control information bandwidth is set to zero.

Figure 15:
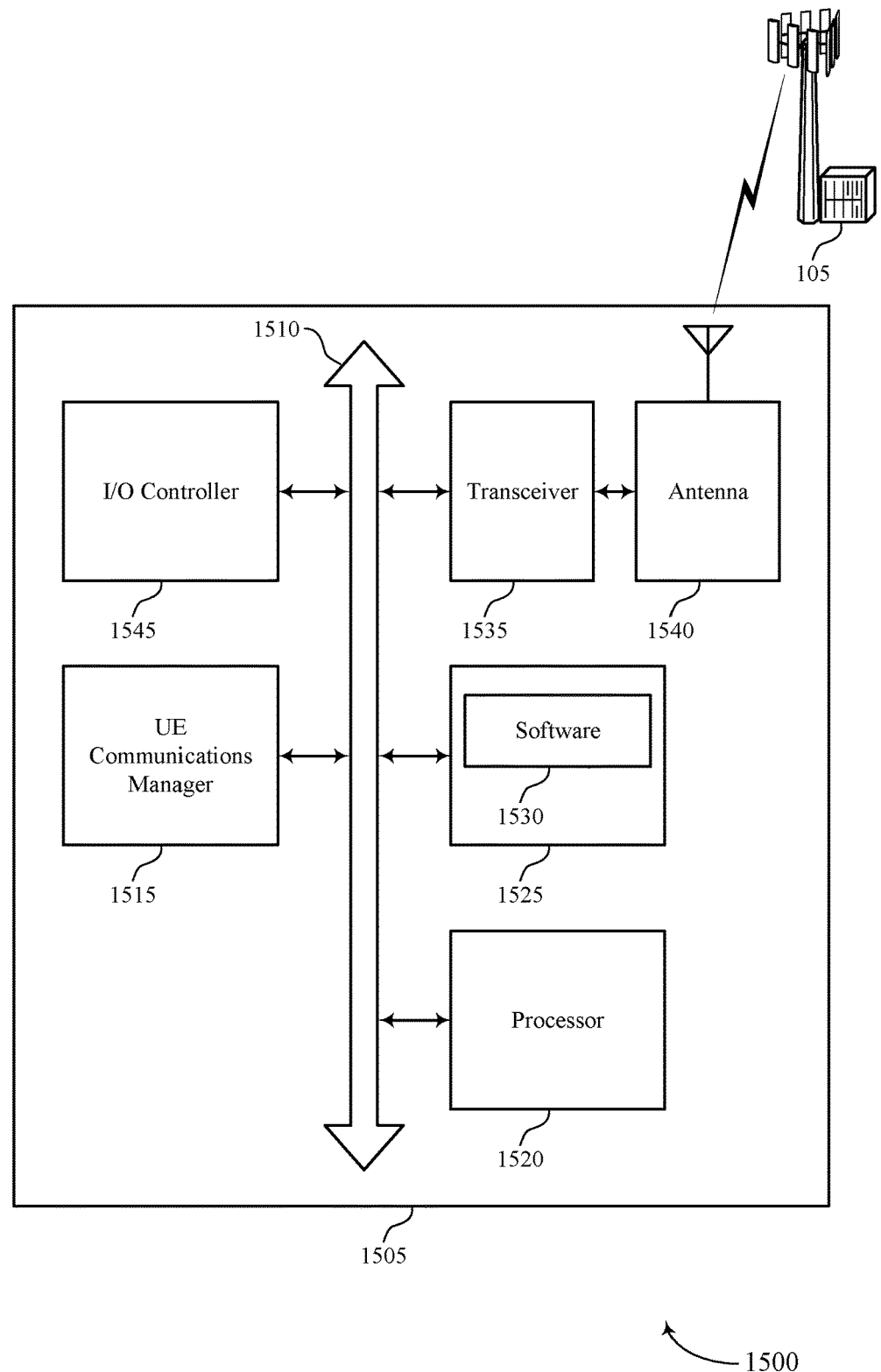
FIG. 15 illustrates a block diagram of a system including a UE that supports slot structure design using guard intervals in a single carrier waveform in accordance with aspects of the present disclosure.

FIG. 15 shows a diagram of a system 1500 including a device 1505 that supports slot structure design using guard intervals in a single carrier waveform in accordance with aspects of the present disclosure. Device 1505 may be an example of or include the components of wireless device 1205, wireless device 1305, or a UE 115 as described above, e.g., with reference to FIGS. 12 and 13. Device 1505 may include components for bi-directional voice and data communications including components for transmitting and receiving communications, including UE communications manager 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 105.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting slot structure design using guard intervals in a single carrier waveform).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware or software operation such as the interaction with peripheral components or devices.

Software 1530 may include code to implement aspects of the present disclosure, including code to support slot structure design using guard intervals in a single carrier waveform. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
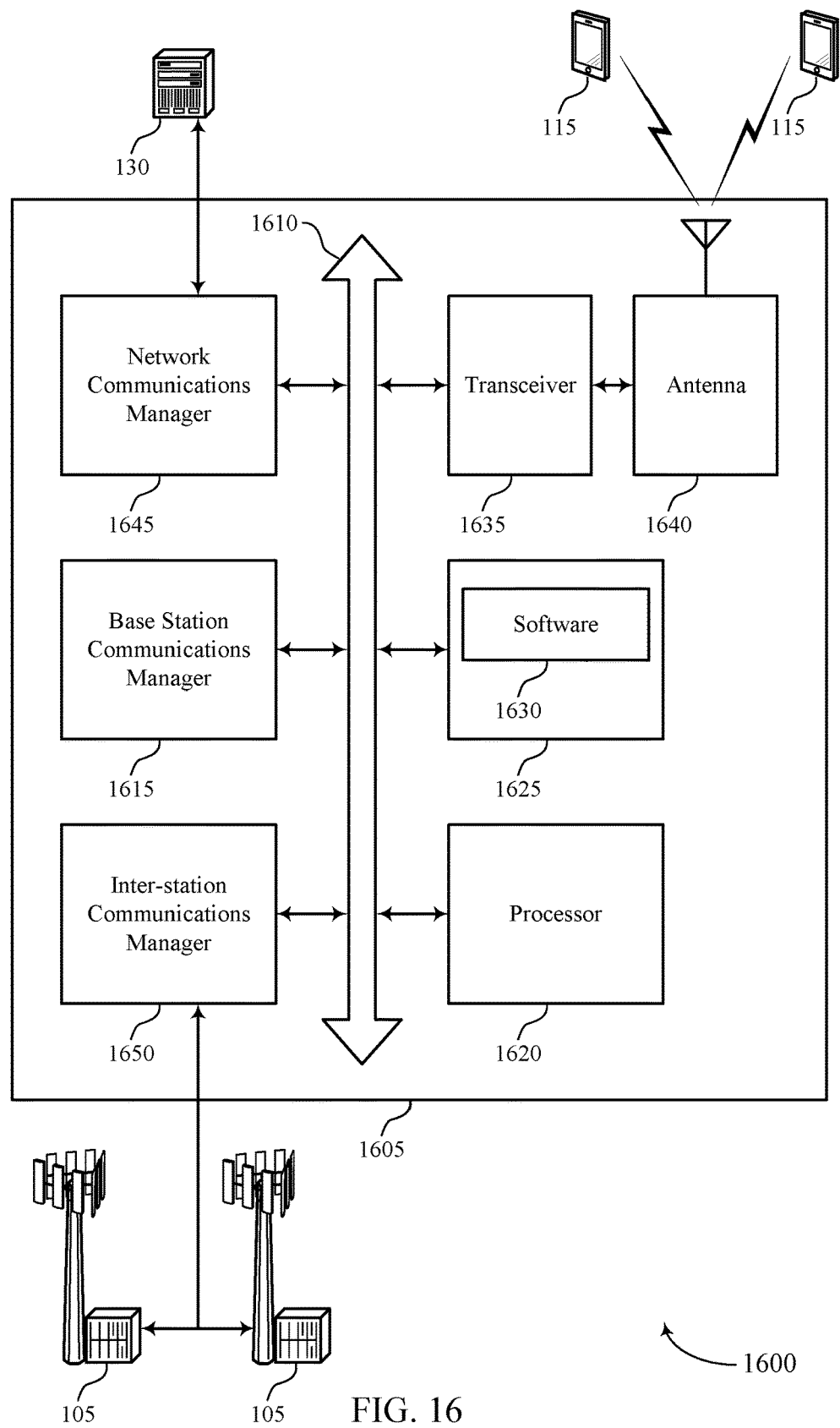
FIG. 16 illustrates a block diagram of a system including a base station that supports slot structure design using guard intervals in a single carrier waveform in accordance with aspects of the present disclosure.

FIG. 16 shows a diagram of a system 1600 including a device 1605 that supports slot structure design using guard intervals in a single carrier waveform in accordance with aspects of the present disclosure. Device 1605 may be an example of or include the components of wireless device 1305, wireless device 1405, or a base station 105 as described above, e.g., with reference to FIGS. 13 and 14. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting slot structure design using guard intervals in a single carrier waveform).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support slot structure design using guard intervals in a single carrier waveform. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
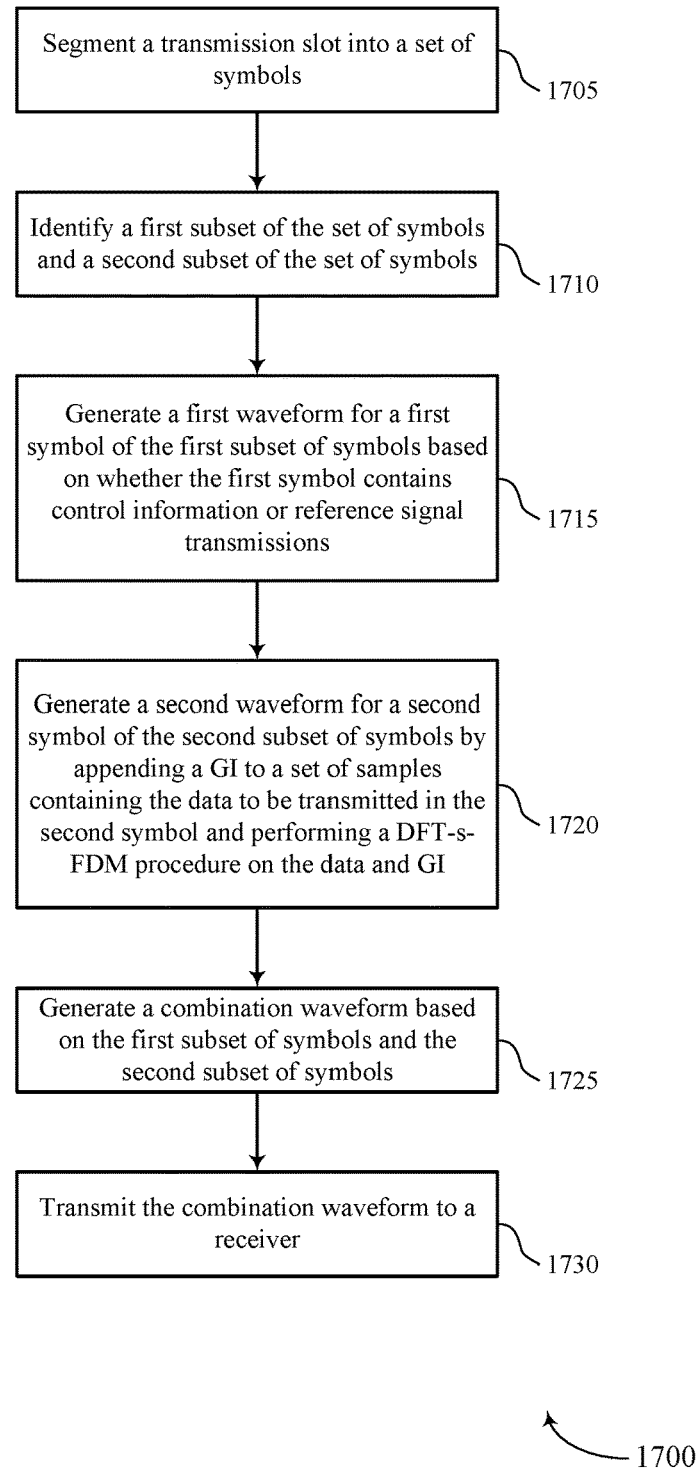
FIGS. 17 through 21 illustrate methods for slot structure design using guard intervals in a single carrier waveform in accordance with aspects of the present disclosure.

FIG. 17 shows a flowchart illustrating a method 1700 for slot structure design using guard intervals in a single carrier waveform in accordance with aspects of the present disclosure. The operations of method 1700 may be implemented by a device, such as a UE 115 or base station 105 or its components as described herein. For example, the operations of method 1700 may be performed by a communications manager as described with reference to FIGS. 12 through 14. In some examples, the device may execute a set of codes to control the functional elements of the device to perform the functions described below. Additionally or alternatively, the device may perform aspects of the functions described below using special-purpose hardware.

At block 1705 the device may segment a transmission slot into a set of symbols. The operations of block 1705 may be performed according to the methods described herein. In certain examples, aspects of the operations of block 1705 may be performed by a segmentation manager as described with reference to FIGS. 12 through 14.

At block 1710 the device may identify a first subset of the set of symbols and a second subset of the set of symbols. The operations of block 1710 may be performed according to the methods described herein. In certain examples, aspects of the operations of block 1710 may be performed by a segmentation manager as described with reference to FIGS. 12 through 14.

At block 1715 the device may generate a first waveform for a first symbol of the first subset of symbols based at least in part on whether the first symbol contains control information or reference signal transmissions. The operations of block 1715 may be performed according to the methods described herein. In certain examples, aspects of the operations of block 1715 may be performed by a reference/control waveform generator as described with reference to FIGS. 12 through 14.

At block 1720 the device may generate a second waveform for a second symbol of the second subset of symbols by appending a GI to a set of samples containing the data to be transmitted in the second symbol and performing a DFT-s-FDM procedure on the data and GI. The operations of block 1720 may be performed according to the methods described herein. In certain examples, aspects of the operations of block 1720 may be performed by a data waveform generator as described with reference to FIGS. 12 through 14.

At block 1725 the device may generate a combination waveform based on the first subset of symbols and the second subset of symbols. The operations of block 1725 may be performed according to the methods described herein. In certain examples, aspects of the operations of block 1725 may be performed by a transmission waveform generator as described with reference to FIGS. 12 through 14.

At block 1730 the device may transmit the combination waveform to a receiver. The operations of block 1730 may be performed according to the methods described herein. In certain examples, aspects of the operations of block 1730 may be performed by a transmission waveform generator as described with reference to FIGS. 12 through 14.

Figure 18:
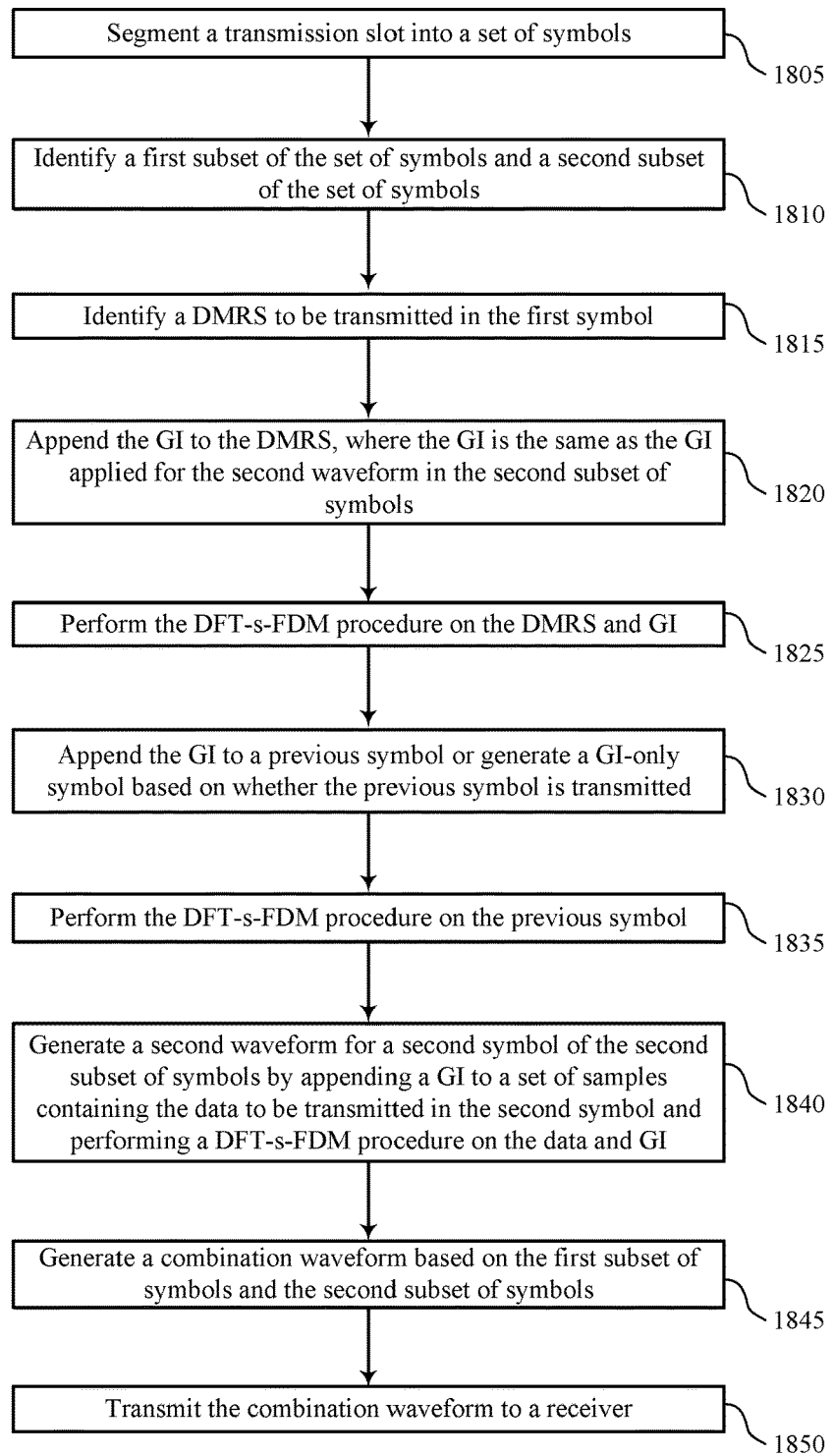

FIG. 18 shows a flowchart illustrating a method 1800 for slot structure design using guard intervals in a single carrier waveform in accordance with aspects of the present disclosure. The operations of method 1800 may be implemented by a device, such as a UE 115 or base station 105 or its components as described herein. For example, the operations of method 1800 may be performed by a communications manager as described with reference to FIGS. 12 through 14. In some examples, the device may execute a set of codes to control the functional elements of the device to perform the functions described below. Additionally or alternatively, the device may perform aspects of the functions described below using special-purpose hardware.

At block 1805 the device may segment a transmission slot into a set of symbols. The operations of block 1805 may be performed according to the methods described herein. In certain examples, aspects of the operations of block 1805 may be performed by a segmentation manager as described with reference to FIGS. 12 through 14.

At block 1810 the device may identify a first subset of the set of symbols and a second subset of the set of symbols. The operations of block 1810 may be performed according to the methods described herein. In certain examples, aspects of the operations of block 1810 may be performed by a segmentation manager as described with reference to FIGS. 12 through 14.

At block 1815 the device may identify a DMRS to be transmitted in the first symbol. The operations of block 1815 may be performed according to the methods described herein. In certain examples, aspects of the operations of block 1815 may be performed by a reference/control waveform generator as described with reference to FIGS. 12 through 14.

At block 1820 the device may append the GI to the DMRS, wherein the GI is the same as the GI applied for the second waveform in the second subset of symbols. The operations of block 1820 may be performed according to the methods described herein. In certain examples, aspects of the operations of block 1820 may be performed by a reference/control waveform generator as described with reference to FIGS. 12 through 14.

At block 1825 the device may perform the DFT-s-FDM procedure on the DMRS and GI. The operations of block 1825 may be performed according to the methods described herein. In certain examples, aspects of the operations of block 1825 may be performed by a reference/control waveform generator as described with reference to FIGS. 12 through 14.

At block 1830 the device may append the GI to a previous symbol or generate a GI-only symbol based at least in part on whether the previous symbol is transmitted. The operations of block 1830 may be performed according to the methods described herein. In certain examples, aspects of the operations of block 1830 may be performed by a reference/control waveform generator as described with reference to FIGS. 12 through 14.

At block 1835 the device may perform the DFT-s-FDM procedure on the previous symbol. The operations of block 1835 may be performed according to the methods described herein. In certain examples, aspects of the operations of block 1835 may be performed by a reference/control waveform generator as described with reference to FIGS. 12 through 14.

At block 1840 the device may generate a second waveform for a second symbol of the second subset of symbols by appending a GI to a set of samples containing the data to be transmitted in the second symbol and performing a DFT-s-FDM procedure on the data and GI. The operations of block 1840 may be performed according to the methods described herein. In certain examples, aspects of the operations of block 1840 may be performed by a data waveform generator as described with reference to FIGS. 12 through 14.

At block 1845 the device may generate a combination waveform based on the first subset of symbols and the second subset of symbols. The operations of block 1845 may be performed according to the methods described herein. In certain examples, aspects of the operations of block 1845 may be performed by a transmission waveform generator as described with reference to FIGS. 12 through 14.

At block 1850 the device may transmit the combination waveform to a receiver. The operations of block 1850 may be performed according to the methods described herein. In certain examples, aspects of the operations of block 1850 may be performed by a transmission waveform generator as described with reference to FIGS. 12 through 14.

Figure 19:
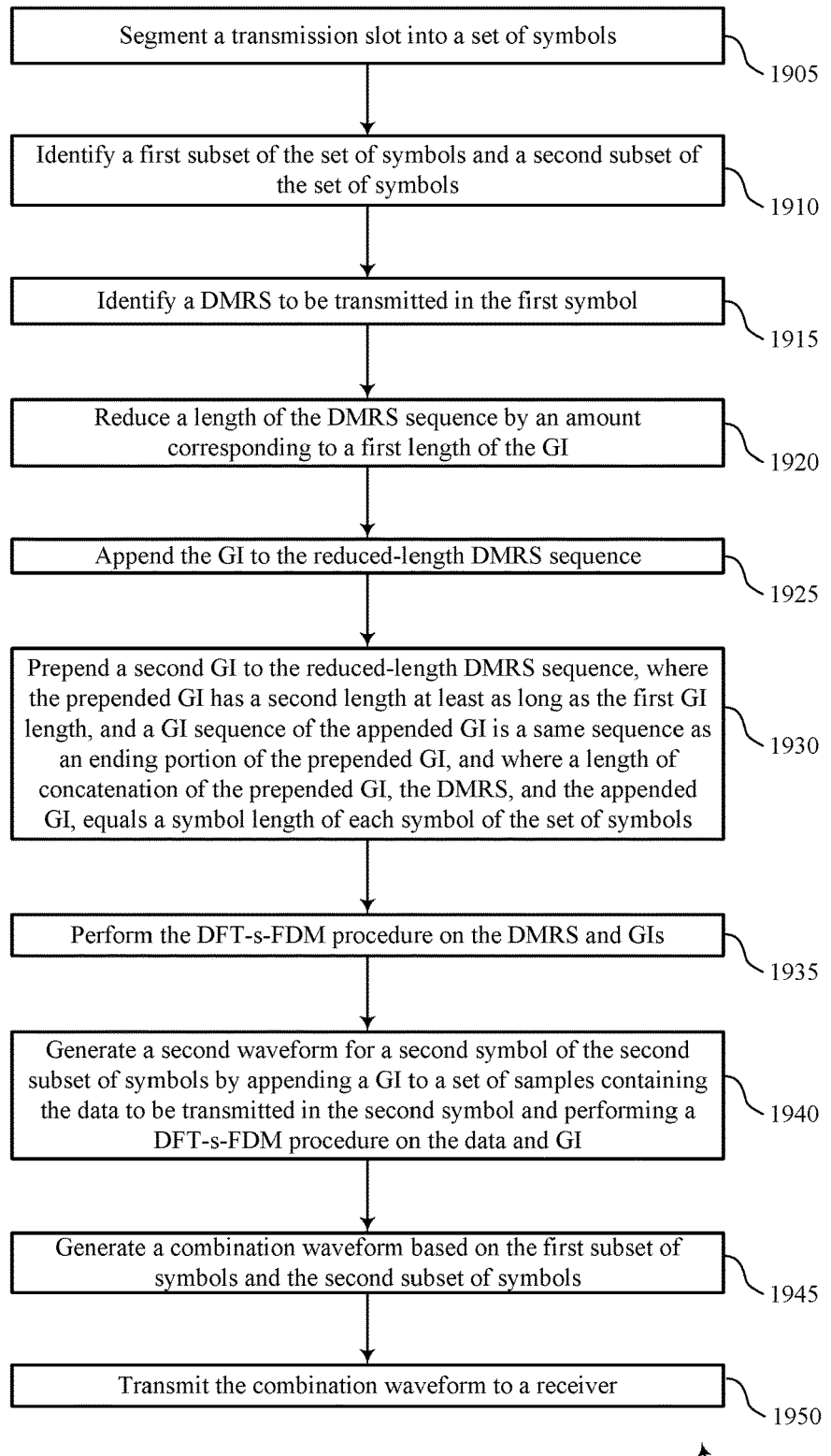

FIG. 19 shows a flowchart illustrating a method 1900 for slot structure design using guard intervals in a single carrier waveform in accordance with aspects of the present disclosure. The operations of method 1900 may be implemented by a device, such as a UE 115 or base station 105 or its components as described herein. For example, the operations of method 1900 may be performed by a communications manager as described with reference to FIGS. 12 through 14. In some examples, the device may execute a set of codes to control the functional elements of the device to perform the functions described below. Additionally or alternatively, the device may perform aspects of the functions described below using special-purpose hardware.

At block 1905 the device may segment a transmission slot into a set of symbols. The operations of block 1905 may be performed according to the methods described herein. In certain examples, aspects of the operations of block 1905 may be performed by a segmentation manager as described with reference to FIGS. 12 through 14.

At block 1910 the device may identify a first subset of the set of symbols and a second subset of the set of symbols. The operations of block 1910 may be performed according to the methods described herein. In certain examples, aspects of the operations of block 1910 may be performed by a segmentation manager as described with reference to FIGS. 12 through 14.

At block 1915 the device may identify a DMRS to be transmitted in the first symbol. The operations of block 1915 may be performed according to the methods described herein. In certain examples, aspects of the operations of block 1915 may be performed by a reference/control waveform generator as described with reference to FIGS. 12 through 14.

At block 1920 the device may reduce a length of the DMRS sequence by an amount corresponding to a first length of the GI. The operations of block 1920 may be performed according to the methods described herein. In certain examples, aspects of the operations of block 1920 may be performed by a reference/control waveform generator as described with reference to FIGS. 12 through 14.

At block 1925 the device may append the GI to the reduced-length DMRS sequence. The operations of block 1925 may be performed according to the methods described herein. In certain examples, aspects of the operations of block 1925 may be performed by a reference/control waveform generator as described with reference to FIGS. 12 through 14.

At block 1930 the device may prepend a second GI to the reduced-length DMRS sequence, wherein the prepended GI has a second length at least as long as the first GI length, and a GI sequence of the appended GI is a same sequence as an ending portion of the prepended GI, and wherein a length of concatenation of the prepended GI, the DMRS, and the appended GI, equals a symbol length of each symbol of the set of symbols. The operations of block 1930 may be performed according to the methods described herein. In certain examples, aspects of the operations of block 1930 may be performed by a reference/control waveform generator as described with reference to FIGS. 12 through 14.

At block 1935 the device may perform the DFT-s-FDM procedure on the DMRS and GIs. The operations of block 1935 may be performed according to the methods described herein. In certain examples, aspects of the operations of block 1935 may be performed by a reference/control waveform generator as described with reference to FIGS. 12 through 14.

At block 1940 the device may generate a second waveform for a second symbol of the second subset of symbols by appending a GI to a set of samples containing the data to be transmitted in the second symbol and performing a DFT-s-FDM procedure on the data and GI. The operations of block 1940 may be performed according to the methods described herein. In certain examples, aspects of the operations of block 1940 may be performed by a data waveform generator as described with reference to FIGS. 12 through 14.

At block 1945 the device may generate a combination waveform based on the first subset of symbols and the second subset of symbols. The operations of block 1945 may be performed according to the methods described herein. In certain examples, aspects of the operations of block 1945 may be performed by a transmission waveform generator as described with reference to FIGS. 12 through 14.

At block 1950 the device may transmit the combination waveform to a receiver. The operations of block 1950 may be performed according to the methods described herein. In certain examples, aspects of the operations of block 1950 may be performed by a transmission waveform generator as described with reference to FIGS. 12 through 14.

Figure 20:
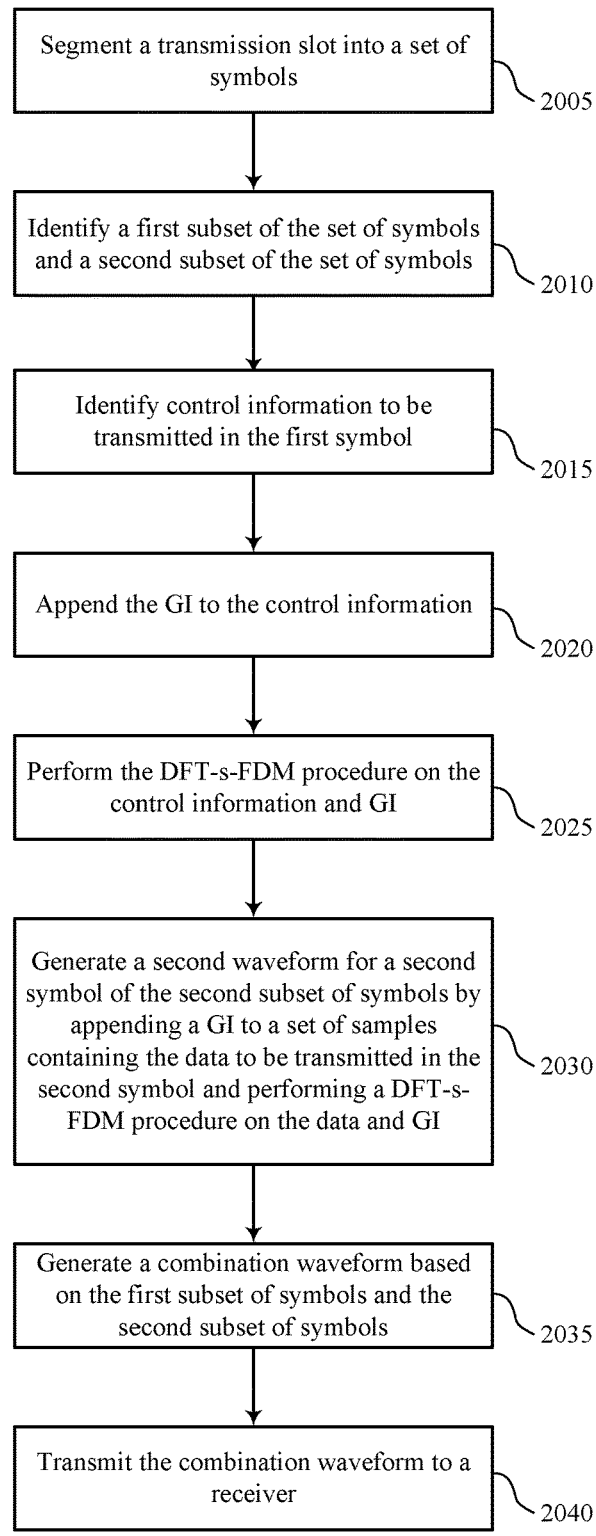

FIG. 20 shows a flowchart illustrating a method 2000 for slot structure design using guard intervals in a single carrier waveform in accordance with aspects of the present disclosure. The operations of method 2000 may be implemented by a device, such as a UE 115 or base station 105 or its components as described herein. For example, the operations of method 2000 may be performed by a communications manager as described with reference to FIGS. 12 through 14. In some examples, a device may execute a set of codes to control the functional elements of the device to perform the functions described below. Additionally or alternatively, the device may perform aspects of the functions described below using special-purpose hardware.

At block 2005 the device may segment a transmission slot into a set of symbols. The operations of block 2005 may be performed according to the methods described herein. In certain examples, aspects of the operations of block 2005 may be performed by a segmentation manager as described with reference to FIGS. 12 through 14.

At block 2010 the device may identify a first subset of the set of symbols and a second subset of the set of symbols. The operations of block 2010 may be performed according to the methods described herein. In certain examples, aspects of the operations of block 2010 may be performed by a segmentation manager as described with reference to FIGS. 12 through 14.

At block 2015 the device may identify control information to be transmitted in the first symbol. The operations of block 2015 may be performed according to the methods described herein. In certain examples, aspects of the operations of block 2015 may be performed by a reference/control waveform generator as described with reference to FIGS. 12 through 14.

At block 2020 the device may append the GI to the control information. The operations of block 2020 may be performed according to the methods described herein. In certain examples, aspects of the operations of block 2020 may be performed by a reference/control waveform generator as described with reference to FIGS. 12 through 14.

At block 2025 the device may perform the DFT-s-FDM procedure on the control information and GI. The operations of block 2025 may be performed according to the methods described herein. In certain examples, aspects of the operations of block 2025 may be performed by a reference/control waveform generator as described with reference to FIGS. 12 through 14.

At block 2030 the device may generate a second waveform for a second symbol of the second subset of symbols by appending a GI to a set of samples containing the data to be transmitted in the second symbol and performing a DFT-s-FDM procedure on the data and GI. The operations of block 2030 may be performed according to the methods described herein. In certain examples, aspects of the operations of block 2030 may be performed by a data waveform generator as described with reference to FIGS. 12 through 14.

At block 2035 the device may generate a combination waveform based on the first subset of symbols and the second subset of symbols. The operations of block 2035 may be performed according to the methods described herein. In certain examples, aspects of the operations of block 2035 may be performed by a transmission waveform generator as described with reference to FIGS. 12 through 14.

At block 2040 the device may transmit the combination waveform to a receiver. The operations of block 2040 may be performed according to the methods described herein. In certain examples, aspects of the operations of block 2040 may be performed by a transmission waveform generator as described with reference to FIGS. 12 through 14.

Figure 21:
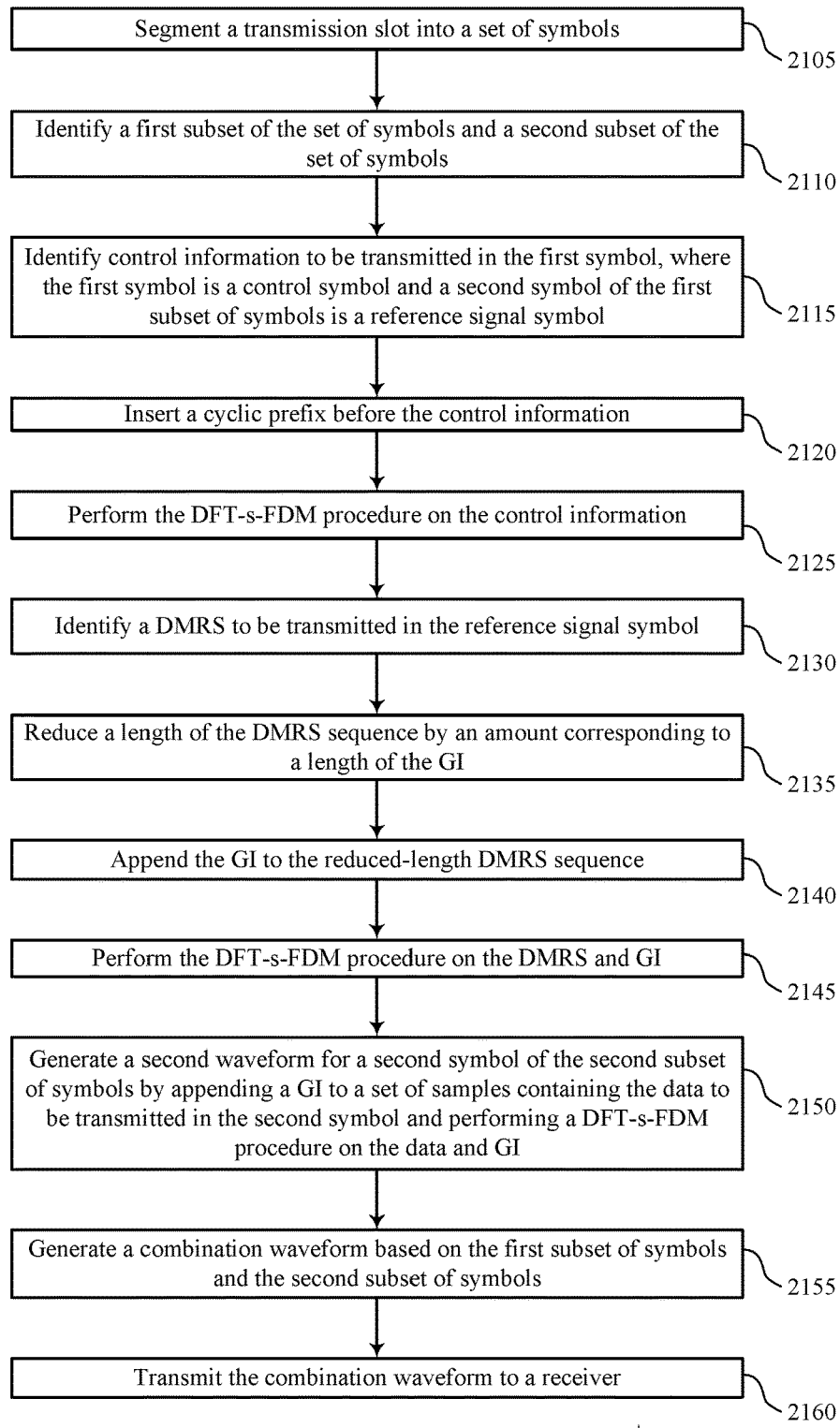

FIG. 21 shows a flowchart illustrating a method 2100 for slot structure design using guard intervals in a single carrier waveform in accordance with aspects of the present disclosure. The operations of method 2100 may be implemented by a device, such as a UE 115 or base station 105 or its components as described herein. For example, the operations of method 2100 may be performed by a communications manager as described with reference to FIGS. 12 through 14. In some examples, a device may execute a set of codes to control the functional elements of the device to perform the functions described below. Additionally or alternatively, the device may perform aspects of the functions described below using special-purpose hardware.

At block 2105 the device may segment a transmission slot into a set of symbols. The operations of block 2105 may be performed according to the methods described herein. In certain examples, aspects of the operations of block 2105 may be performed by a segmentation manager as described with reference to FIGS. 12 through 14.

At block 2110 the device may identify a first subset of the set of symbols and a second subset of the set of symbols. The operations of block 2110 may be performed according to the methods described herein. In certain examples, aspects of the operations of block 2110 may be performed by a segmentation manager as described with reference to FIGS. 12 through 14.

At block 2115 the device may identify control information to be transmitted in the first symbol, wherein the first symbol is a control symbol and a second symbol of the first subset of symbols is a reference signal symbol. The operations of block 2115 may be performed according to the methods described herein. In certain examples, aspects of the operations of block 2115 may be performed by a reference/control waveform generator as described with reference to FIGS. 12 through 14.

At block 2120 the device may insert a cyclic prefix before the control information. The operations of block 2120 may be performed according to the methods described herein. In certain examples, aspects of the operations of block 2120 may be performed by a reference/control waveform generator as described with reference to FIGS. 12 through 14.

At block 2125 the device may perform the DFT-s-FDM procedure on the control information. The operations of block 2125 may be performed according to the methods described herein. In certain examples, aspects of the operations of block 2125 may be performed by a reference/control waveform generator as described with reference to FIGS. 12 through 14.

At block 2130 the device may identify a DMRS to be transmitted in the reference signal symbol. The operations of block 2130 may be performed according to the methods described herein. In certain examples, aspects of the operations of block 2130 may be performed by a reference/control waveform generator as described with reference to FIGS. 12 through 14.

At block 2135 the device may reduce a length of the DMRS sequence by an amount corresponding to a length of the GI. The operations of block 2135 may be performed according to the methods described herein. In certain examples, aspects of the operations of block 2135 may be performed by a reference/control waveform generator as described with reference to FIGS. 12 through 14.

At block 2140 the device may append the GI to the reduced-length DMRS sequence. The operations of block 2140 may be performed according to the methods described herein. In certain examples, aspects of the operations of block 2140 may be performed by a reference/control waveform generator as described with reference to FIGS. 12 through 14.

At block 2145 the device may perform the DFT-s-FDM procedure on the DMRS and GI. The operations of block 2145 may be performed according to the methods described herein. In certain examples, aspects of the operations of block 2145 may be performed by a reference/control waveform generator as described with reference to FIGS. 12 through 14.

At block 2150 the device may generate a second waveform for a second symbol of the second subset of symbols by appending a GI to a set of samples containing the data to be transmitted in the second symbol and performing a DFT-s-FDM procedure on the data and GI. The operations of block 2150 may be performed according to the methods described herein. In certain examples, aspects of the operations of block 2150 may be performed by a data waveform generator as described with reference to FIGS. 12 through 14.

At block 2155 the device may generate a combination waveform based on the first subset of symbols and the second subset of symbols. The operations of block 2155 may be performed according to the methods described herein. In certain examples, aspects of the operations of block 2155 may be performed by a transmission waveform generator as described with reference to FIGS. 12 through 14.

At block 2160 the device may transmit the combination waveform to a receiver. The operations of block 2160 may be performed according to the methods described herein. In certain examples, aspects of the operations of block 2160 may be performed by a transmission waveform generator as described with reference to FIGS. 12 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
segmenting a transmission slot into a set of symbols;
identifying a first subset of the set of symbols and a second subset of the set of symbols;
generating a first waveform for a first symbol of the first subset of symbols based at least in part on whether the first symbol contains control information or reference signal transmissions;
generating a second waveform for a second symbol of the second subset of symbols by appending a guard interval (GI) to a set of samples containing data to be transmitted in the second symbol and performing a discrete Fourier transform spread frequency division multiplexing (DFT-s-FDM) procedure on the data and GI;
generating a combination waveform based on the first subset of symbols and the second subset of symbols; and
transmitting the combination waveform to a receiver.

2. The method of claim 1, wherein the generating the combination waveform comprises:
concatenating the first waveform for the first subset of symbols and the second waveform for the second subset of symbols.

3. The method of claim 1, wherein the first subset of symbols is for one or more of control information or reference signal transmission, and the second subset of symbols is for data transmission.

4. The method of claim 1, wherein generating the first waveform comprises:
identifying a demodulation reference signal (DMRS) to be transmitted in the first symbol;
appending the GI to the DMRS, wherein the GI is the same as the GI applied for the second waveform in the second subset of symbols;
performing the DFT-s-FDM procedure on the DMRS and GI;
appending the GI to a previous symbol or generating a GI-only symbol based at least in part on whether the previous symbol is transmitted; and
performing the DFT-s-FDM procedure on the previous symbol.

5. The method of claim 4, wherein a discrete Fourier transform (DFT) window size used in the DFT-s-FDM procedure performed on the DMRS and GI is set to be a same DFT window size as for the DFT-s-FDM procedure performed on the data and GI when generating the second waveform for the second symbol.

6. The method of claim 4, wherein the DMRS and appended GI form a reference signal usable for channel estimation at the receiver.

7. The method of claim 4, wherein the DMRS and appended GI form a sequence that is selected to have a peak-to-average-power ratio (PAPR) that is below a PAPR threshold value and a frequency domain energy variation across tones that is below an energy variation threshold value.

8. The method of claim 7, wherein the sequence is a Zadoff-Chu sequence.

9. The method of claim 1, wherein generating the first waveform comprises:
identifying a demodulation reference signal (DMRS) to be transmitted in the first symbol;
reducing a length of the DMRS sequence by an amount corresponding to a first length of the GI;
appending the GI to the reduced-length DMRS sequence;

prepending a second GI to the reduced-length DMRS sequence, wherein the prepended GI has a second length at least as long as the first GI length, and a GI sequence of the appended GI is a same sequence as an ending portion of the prepended GI, and wherein a length of concatenation of the prepended GI, the DMRS, and the appended GI, equals a symbol length of each symbol of the set of symbols; and performing the DFT-s-FDM procedure on the DMRS and GIs.

10. The method of claim 9, wherein a discrete Fourier transform (DFT) window size used in the DFT-s-FDM procedure performed on the DMRS and GI is shorter than a DFT window size used in the DFT-s-FDM procedure performed on the data and GI when generating the second waveform for the second symbol.

11. The method of claim 1, wherein generating the first waveform comprises:
identifying control information to be transmitted in the first symbol;
appending the GI to the control information; and
performing the DFT-s-FDM procedure on the control information and GI.

12. The method of claim 11, wherein a discrete Fourier transform (DFT) window size used in the DFT-s-FDM procedure performed on the control information and GI is set to be a same DFT window size as for the DFT-s-FDM procedure performed on the data and GI when generating the second waveform for the second symbol.

13. The method of claim 11, wherein a bandwidth of the control information is less than a bandwidth of the data, and wherein a sequence for the GI is selected to correspond to the bandwidth of the control information.

14. The method of claim 13, wherein portions of the GI that correspond to bandwidth that is outside of the control information bandwidth are set to zero.

15. The method of claim 1, wherein the first symbol is a control symbol and a second symbol of the first subset of symbols is a reference signal symbol, and wherein the generating the first waveform comprises:
identifying control information to be transmitted in the first symbol;
inserting a cyclic prefix before the control information;
performing the DFT-s-FDM procedure on the control information;
identifying a demodulation reference signal (DMRS) to be transmitted in the reference signal symbol;
reducing a length of the DMRS sequence by an amount corresponding to a length of the GI;
appending the GI to the reduced-length DMRS sequence; and
performing the DFT-s-FDM procedure on the DMRS and GI.

16. The method of claim 15, wherein the first symbol has a different waveform than the reference signal symbol and the second subset of symbols.

17. The method of claim 15, wherein the reference signal symbol provides a sequence to enable phase tracking of a transmission beam used to transmit the first waveform and the second waveform.

18. The method of claim 15, wherein a discrete Fourier transform (DFT) window size used in the DFT-s-FDM procedure performed on the control information, and DMRS and GI, is different than a DFT window size used in the DFT-s-FDM procedure performed on the data and GI when generating the second waveform for the second symbol.

19. The method of claim 1, wherein the generating the second waveform comprises:
receiving K data samples;
appending L GI samples to the K data samples to provide an appended set of K+L samples;
performing a discrete Fourier transform (DFT) of a size K+L on the appended data and GI samples;
tone mapping an output of the DFT to N tones; and
performing an inverse DFT (IDFT) of a size N on the output of the DFT to generate a time domain signal having N samples.

20. An apparatus for wireless communication, comprising:
means for segmenting a transmission slot into a set of symbols;
means for identifying a first subset of the set of symbols and a second subset of the set of symbols;
means for generating a first waveform for a first symbol of the first subset of symbols based at least in part on whether the first symbol contains control information or reference signal transmissions;
means for generating a second waveform for a second symbol of the second subset of symbols by appending a GI to a set of samples containing data to be transmitted in the second symbol and performing a DFT-s-FDM procedure on the data and GI;
means for generating a combination waveform based on the first subset of symbols and the second subset of symbols; and
means for transmitting the combination waveform to a receiver.

21. An apparatus for wireless communication, comprising:
a processor;
memory in electronic communication with the processor; and
instructions stored in the memory and operable, when executed by the processor, to cause the apparatus to:
segment a transmission slot into a set of symbols;
identify a first subset of the set of symbols and a second subset of the set of symbols;
generate a first waveform for a first symbol of the first subset of symbols based at least in part on whether the first symbol contains control information or reference signal transmissions;
generate a second waveform for a second symbol of the second subset of symbols by appending a GI to a set of samples containing data to be transmitted in the second symbol and performing a DFT-s-FDM procedure on the data and GI;
generate a combination waveform based on the first subset of symbols and the second subset of symbols; and
transmit the combination waveform to a receiver.

22. The apparatus of claim 21, further comprising:
a waveform generator,
wherein the instructions to generate the combination waveform are executable by the processor to cause the apparatus to:
concatenate, by the waveform generator, the first waveform for the first subset of symbols and the second waveform for the second subset of symbols.

23. The apparatus of claim 21, wherein the first subset of symbols is for one or more of control information or reference signal transmission, and the second subset of symbols is for data transmission.

24. The apparatus of claim 21, further comprising:
a waveform generator,
wherein the instructions to generate the first waveform are executable by the processor to cause the apparatus to:
identify a demodulation reference signal (DMRS) to be transmitted in the first symbol;
append the GI to the DMRS, wherein the GI is the same as the GI applied for the second waveform in the second subset of symbols;
perform the DFT-s-FDM procedure on the DMRS and GI;
append the GI to a previous symbol or generating a GI-only symbol based at least in part on whether the previous symbol is transmitted; and
perform, by the waveform generator, the DFT-s-FDM procedure on the previous symbol.

25. The apparatus of claim 24, wherein a discrete Fourier transform (DFT) window size used in the DFT-s-FDM procedure performed on the DMRS and GI is set to be a same DFT window size as for the DFT-s-FDM procedure performed on the data and GI when generating the second waveform for the second symbol.

26. The apparatus of claim 24, wherein the DMRS and appended GI form a reference signal usable for channel estimation at the receiver.

27. The apparatus of claim 24, wherein the DMRS and appended GI form a sequence that is selected to have a peak-to-average-power ratio (PAPR) that is below a PAPR threshold value and a frequency domain energy variation across tones that is below an energy variation threshold value.

28. The apparatus of claim 21, further comprising:
a waveform generator,
wherein the instructions to generate the first waveform are executable by the processor to cause the apparatus to:
identify a demodulation reference signal (DMRS) to be transmitted in the first symbol;
reduce a length of the DMRS sequence by an amount corresponding to a first length of the GI;
append the GI to the reduced-length DMRS sequence;
prepend a second GI to the reduced-length DMRS sequence, wherein the prepended GI has a second length at least as long as the first GI length, and a GI sequence of the appended GI is a same sequence as an ending portion of the prepended GI, and wherein a length of concatenation of the prepended GI, the DMRS, and the appended GI, equals a symbol length of each symbol of the set of symbols; and
perform, by the waveform generator, the DFT-s-FDM procedure on the DMRS and GIs.

29. The apparatus of claim 28, wherein a discrete Fourier transform (DFT) window size used in the DFT-s-FDM procedure performed on the DMRS and GI is shorter than a DFT window size used in the DFT-s-FDM procedure performed on the data and GI when generating the second waveform for the second symbol.

30. A non-transitory computer readable medium storing code for wireless communication, the code comprising instructions executable by a processor to:
segment a transmission slot into a set of symbols;
identify a first subset of the set of symbols and a second subset of the set of symbols;
generate a first waveform for a first symbol of the first subset of symbols based at least in part on whether the first symbol contains control information or reference signal transmissions;
generate a second waveform for a second symbol of the second subset of symbols by appending a GI to a set of samples containing data to be transmitted in the second symbol and performing a DFT-s-FDM procedure on the data and GI;
generate a combination waveform based on the first subset of symbols and the second subset of symbols; and
transmit the combination waveform to a receiver.

* * * * *